United States Patent
Eom et al.

(10) Patent No.: US 9,444,649 B2
(45) Date of Patent: Sep. 13, 2016

(54) METHOD FOR SENDING AND RECEIVING SESSION HISTORY IN A COMMUNICATIONS SYSTEM

(75) Inventors: Hyeon-Sang Eom, Seoul (KR); Sung-Jin Park, Suwon-si (KR); Seung-Yong Lee, Seoul (KR); Kyung-Tak Lee, Yongin-si (KR)

(73) Assignees: Samsung Electronics Co., Ltd (KR); Seoul National University R&DB Foundation (KR)

( * ) Notice: Subject to any disclaimer, the term of this patent is extended or adjusted under 35 U.S.C. 154(b) by 904 days.

(21) Appl. No.: 13/148,234

(22) PCT Filed: Feb. 4, 2010

(86) PCT No.: PCT/KR2010/000697
§ 371 (c)(1),
(2), (4) Date: Aug. 5, 2011

(87) PCT Pub. No.: WO2010/090465
PCT Pub. Date: Aug. 12, 2010

(65) Prior Publication Data
US 2011/0295965 A1 Dec. 1, 2011

(30) Foreign Application Priority Data
Feb. 5, 2009 (KR) .................. 10-2009-0009376

(51) Int. Cl.
*G06F 15/16* (2006.01)
*H04L 12/58* (2006.01)
*H04L 29/06* (2006.01)

(52) U.S. Cl.
CPC .......... *H04L 12/589* (2013.01); *H04L 12/586* (2013.01); *H04L 51/16* (2013.01); *H04L 51/36* (2013.01); *H04L 65/1006* (2013.01); *H04L 65/1063* (2013.01); *H04L 65/403* (2013.01)

(58) Field of Classification Search
CPC ....................................................... H04L 12/58
USPC ........................................ 709/207, 227, 203
See application file for complete search history.

(56) References Cited

U.S. PATENT DOCUMENTS 6,480,885 B1 * 11/2002 Olivier ................ H04L 12/1859
 709/202
7,360,164 B2 * 4/2008 Bjoernsen et al. ........... 715/751
(Continued)

FOREIGN PATENT DOCUMENTS

KR 1020060026409 A 3/2006
WO WO 2008/122185 10/2008

OTHER PUBLICATIONS

PCT/ISA/237 Written Opinion issued on PCT/KR2010/000697 (4 pp.).
PCT/ISA/210 Search Report issued on PCT/KR2010/000697 (4 pp.).
(Continued)

*Primary Examiner* — Frantz Jean
(74) *Attorney, Agent, or Firm* — The Farrell Law Firm, P.C.

(57) ABSTRACT

A method is provided for receiving a session history by a Controlling Function (CF) in a communication system. The method includes sending, by a CF in a first domain, a first message requesting a session history to a Conversation Server (CS) in the first domain; receiving, from the CS in the first domain, a second message including access information to a CS in a second domain, which has a session history, when the CS in the first domain has no session history; sending a third message requesting a session history to the CS in the second domain, which has the session history, based on the access information; and receiving a fourth message including the session history from the CS in the second domain.

15 Claims, 17 Drawing Sheets

(56) References Cited

U.S. PATENT DOCUMENTS

| | | | |
|---|---|---|---|
| 7,441,045 B2* | 10/2008 | Skene | G06F 9/505 709/201 |
| 2004/0015548 A1 | 1/2004 | Lee | |
| 2005/0138137 A1* | 6/2005 | Encarnacion et al. | 709/217 |
| 2007/0100908 A1* | 5/2007 | Jain et al. | 707/204 |
| 2007/0288754 A1* | 12/2007 | Kaji et al. | 713/175 |
| 2009/0025010 A1* | 1/2009 | Foottit et al. | 719/313 |
| 2009/0279455 A1* | 11/2009 | Wang et al. | 370/260 |
| 2010/0023491 A1* | 1/2010 | Huang et al. | 707/3 |
| 2010/0185740 A1* | 7/2010 | Lee et al. | 709/206 |
| 2011/0302211 A1* | 12/2011 | Kilday et al. | 707/785 |
| 2015/0019678 A1* | 1/2015 | King | G06F 12/0813 709/213 |
| 2015/0215287 A1* | 7/2015 | Cottrell | H04L 63/0281 726/12 |

OTHER PUBLICATIONS

Open Mobile Alliance, "Converged IP Messaging", Work Item Document, Doc# OMA-WID_0135-CPM-V1_0-20060510-A, May 2005.

Open Mobile Alliance, "Converged IP Messaging Requirements", Approved Version 1.0, OMA-RD-CPM-V1_0-20120612-A, May 2005.

Open Mobile Alliance, "Converged IP Messaging Architecture", Approved Version 1.0, OMA-AD-CPM-V1_0-20120612-A, Mar. 2008.

J. Rosenberg et al., Request for Comments 3261, "SIP: Session Initiation Protocol," Jun. 2002.

B. Campbell et al., Request for Comments 4975, "The Message Session Relay Protocol (MSRP)," Sep. 2007.

M. Crispin, Request for Comments 3501, "Internet Message Access Protocol—Version 4rev1," Mar. 2003.

* cited by examiner

METHOD FOR SENDING AND RECEIVING SESSION HISTORY IN A COMMUNICATIONS SYSTEM

PRIORITY

This application is a National Phase Entry of PCT International Application No. PCT/KR2010/000697, which was filed Feb. 4, 2010, and claims priority to Korean Patent Application No. 10-2009-0009376, which was filed in the Korean Industrial Property Office on Feb. 5, 2009, the content of each which is incorporated herein by reference.

BACKGROUND OF THE INVENTION

1. Field of the Invention

The present invention relates generally to a communication system, and more particularly, to a method for transmitting and receiving a session history in a communication system.

2. Description of the Related Art

Due to the improvement in performance of recent terminals and the expansion of bandwidths for wireless communications, advanced communication infrastructures have been built, enabling services, which were previously available only in a wired environment, to also be executable in a wireless environment. To meet the diverse needs of users, these services should be providable in all Internet Protocol (IP)-based wired/wireless networks. Accordingly, to meet these demands, Open Mobile Alliance (OMA), which is a global mobile standardization body, has attempted to integrate (or converge) Mobile services and IP-based services by proceeding with a Converged IP Messaging (CPM) session.

Protocols used to provide these integrated or converged services may include a Session Initiation Protocol (SIP), a Message Session Relay Protocol (MSRP), and a Real time Transfer Protocol (RTP).

Among these protocols, SIP, which is defined in the Internet Engineering Task Force (IETF) Request for Comment (RFC) 3261 standard document, is an application-level signaling protocol for establishing, modifying, and terminating a session for multimedia communication such as video and audio communication. More specifically, the SIP sends and receives messages in a request/response manner with protocols existing on User Datagram Protocol (UDP)/Transmission Control Protocol (TCP)/IP layers. The SIP-based request messages include INVITE (invitation to join the session), ACK (acknowledgement of invitation request), BYE (session termination), REGISTER (register location information of user clients in a database of a register server), CANCEL (cancel pending request), and OPTIONS (request for server information), as defined in RFC 3261. The SIP-based response messages include 1xx (information response), 2xx (affirmative response), 3xx (redirection response), 4xx (client error), 5xx (server error), and 6xx (global error), as status codes.

The MSRP, which is defined in the IETF RFC 4975 standard document, is used to transmit text data in a session. Specifically, the MSRP attempts to address shortcomings that transmitting text data using the existing SIP-based MESSAGE messages does not consider associations between the messages, and that the SIP-based MESSAGE messages include a SEND (message sending) message and a REPORT (message sending confirmation) message.

FIG. 1 illustrates a conventional CPM system.

Referring to FIG. 1, the CPM system includes a CPM client 100, e.g., a mobile terminal, and a network apparatus including a CPM Conversation Server (CS) 110, a CPM Controlling Function (CF) unit 120, an application control function unit 130, an interworking selection function unit 140, an interworking function unit 150, a message and media storage client 160, and a Message and Media storage Server (M&MS) 170. The M&MS 170 may be provided as a separate component, or may be included in the CS 110.

The CPM client 100, i.e., a service requestor, creates a session to another CPM client through the CS 110, and receives services from the another CPM client. The M&MS 170 stores data exchanged over a session created between CPM clients and determines whether to store CMP session data, based on a user preference and/or a service provider policy.

The CF 120 creates and manages a session between the CPM client 100 and the CS 110. In other words, if a group session is created, the CF 120 creates a session between the CPM client 100, the CS 110, and the CF 120 in its user domain. After the session is created, the CF 120 sends messages received from the CPM client 100, or a subscriber of the group session, to other subscribers of the group session. The domains may be separated by the service provider.

A set of all kinds of data exchanged between CPM clients, from the start of a session until the present, will be referred to herein as a "session history". The session history is managed by a CPM Conversation History Function (CHF, not shown) in the CS 110, and may be stored in the M&MS 170 and the CPM CHF in the CS 110.

Currently, a session history of a one-to-one session is managed in the CPM CHF in the CS 110, and is temporarily stored in the M&MS 170 or the CPM CHF in the CS 110. The session history of a one-to-one session may be individually managed by CSs in different domains, and may be optionally stored, depending on a user preference and/or a service provider policy.

A method of tracking history information of a group session is disclosed in U.S. Patent Publication No. 2007/0100908, filed by Neeraj Jain, and entitled "Method and Apparatus for Tracking History Information of a Group Session" (hereinafter referred to as "Jain"). However, group selection should precede the tracking in Jain. In addition, creating a group session, and transmitting and receiving a session history are not disclosed in detail in Jain.

SUMMARY OF THE INVENTION

Therefore, the present invention has been designed to address at least some of the aforementioned limitations and problems occurring in the prior art and the present invention provides at least the advantages as described below.

Accordingly, an aspect of the present invention is to provide a method for creating a session history, and managing and transmitting the session history in a communication system.

In accordance with an aspect of the present invention, a method for receiving a session history by a Controlling Function (CF) in a communication system is provided. The method includes sending, by a CF in a first domain, a first message to a Conversation Server (CS) in the first domain, the first message requesting the session history; receiving, from the CS in the first domain, a second message including access information for a CS in a second domain, which has the session history, when the CS in the first domain has no session history; sending, by the CF, a third message to the CS in the second domain, which has the session history, based on the access information, the third message requesting the session history; and receiving, by the CF, a fourth message from the CS in the second domain, the fourth message including the session history.

In accordance with another aspect of the present invention, a method is provided for transmitting and receiving a group session history in a communication system in which a group session is created between at least two client terminals. The method includes sending, by a client terminal in a first domain, a first message to a Conversation Server (CS) in the first domain, the first message requesting the group session history; receiving, by the CS, a second message including access information for a storage area in which the group session history is stored, from a Controlling Function (CF) in a second domain; reading, by the CS, the group session history from the storage area, based on the access information; and transmitting, by the CS, the read group session history to the client terminal.

In accordance with another aspect of the present invention, a method is provided for transmitting and receiving a group session history in a communication system in which a group session is created between at least two client terminals. The method includes sending, by a client terminal in a first domain, a first message to a Conversation Server (CS) in the first domain, the first message requesting the group session history; receiving, by the CS, a second message including access information for a storage area in which the group session history is stored, from a Controlling Function (CF) in a second domain; transmitting, by the CS, the access information to the client terminal; and reading, by the client terminal, the group session history from the storage area, based on the access information received from the CS.

In accordance with another aspect of the present invention, a method is provided for transmitting and receiving a group session history in a communication system in which a group session is created between at least two client terminals. The method includes sending, by a client terminal in a first domain, a first message to a Conversation Server (CS) in the first domain, the first message requesting the group session history; sending, by the CS in the first domain, a second message to a Controlling Function (CF) in a second domain, the second message requesting the group session history; sending, by the CF in the second domain, a third message to a CS in a third domain, the third message requesting the group session history; acquiring, by the CS in the third domain, the group session history from a storage area in which the group session history is stored; transmitting, by the CS in the third domain, the group session history to the CF in the second domain; transmitting, by the CF in the second domain, the group session history to the CS in the first domain; and transmitting, by the CS in the first domain, the group session history to the client terminal in the first domain.

In accordance with another aspect of the present invention, a method is provided for transmitting and receiving a group session history in a communication system in which a group session is created between at least two client terminals. The method includes sending, by a client terminal in a first domain, a first message to a Conversation Server (CS) in the first domain, the first message requesting the group session history; sending, by the CS in the first domain, a second message to a Controlling Function (CF) in a second domain, the second message requesting the group session history; acquiring, by the CF in the second domain, access information for a CS in a third domain, which manages a storage area in which the group session history is stored, from the CS in the third domain; transmitting, by the CF in the second domain, the access information to the CS in the first domain; acquiring, by the CS in the first domain, the group session history from the storage area, based on the access information; and transmitting, by the CS in the first domain, the group session history to the client terminal in the first domain.

In accordance with another aspect of the present invention, a method is provided for transmitting and receiving a group session history in a communication system in which a group session is created between at least two client terminals. The method includes sending, by a client terminal in a first domain, a first message to a Conversation Server (CS) in the first domain, the first message requesting the group session history; sending, by the CS in the first domain, a second message to a Controlling Function (CF) in a second domain, the second message requesting the group session history; acquiring, by the CF in the second domain, access information for a CS in a third domain, which manages a storage area in which the group session history is stored, from the CS in the third domain; transmitting, by the CF in the second domain, the access information to the CS in the first domain; transmitting, by the CS in the first domain, the received access information to the client terminal in the first domain; and acquiring, by the client terminal in the first domain, the group session history from the storage area, based on the access information.

In accordance with another aspect of the present invention, a method is provided for transmitting and receiving a group session history in a communication system in which a group session is created between at least two client terminals. The method includes sending, by a client terminal in a first domain, a first message to a Conversation Server (CS) in the first domain, the first message requesting the group session history; sending, by the CS in the first domain, a second message to a Controlling Function (CF) in a second domain, the second message requesting the group session history; sending, by the CF in the second domain, a third message to a CS in a third domain, which manages a storage area in which the group session history is stored, the third message requesting the group session history; acquiring, by the CS in the third domain, the group session history from the storage area; transmitting, by the CS in the third domain, the group session history to the CF in the second domain; transmitting, by the CF in the second domain, the group session history to the CS in the first domain; and transmitting, by the CS in the first domain, the group session history to the client terminal in the first domain.

In accordance with another aspect of the present invention, a method is provided for transmitting and receiving a group session history in a communication system in which a group session is created between at least two client terminals. The method includes sending, by a client terminal in a first domain, a first message to a Conversation Server (CS) in the first domain, the first message requesting the group session history; sending, by the CS in the first domain, a second message to a Controlling Function (CF) in a second domain, the second message requesting the group session history; acquiring, by the CF in the second domain, the group session history from a storage area in which the group session history is stored; transmitting, by the CF in the second domain, the group session history to the CS in the first domain; and transmitting, by the CS in the first domain, the group session history to the client terminal in the first domain.

BRIEF DESCRIPTION OF THE DRAWINGS

The above and other aspects, features, and advantages of the present invention will be more apparent from the following detailed description taken in conjunction with the accompanying drawings, in which.

DETAILED DESCRIPTION OF EMBODIMENTS OF THE INVENTION

Various embodiments of the present invention will now be described in detail with reference to the accompanying drawings. This present invention may, however, be embodied in many different forms and should not be construed as limited to the embodiments set forth herein. Rather, these embodiments are provided so that this disclosure will be thorough and complete and will fully convey the scope of the present invention to those skilled in the art. In the following description, well-known functions and constructions will be omitted for clarity and conciseness.

The embodiments of the present invention described below provide new methods of creating a session history, and managing and transmitting/receiving the session history in a communication system. The embodiments of present invention are described in conjunction with two different cases independently: (1) where a session history is managed by a CS; and (2) where a session history is managed by a CF. The session history may include both a one-to-one session history and a group session history.

Figure 1:
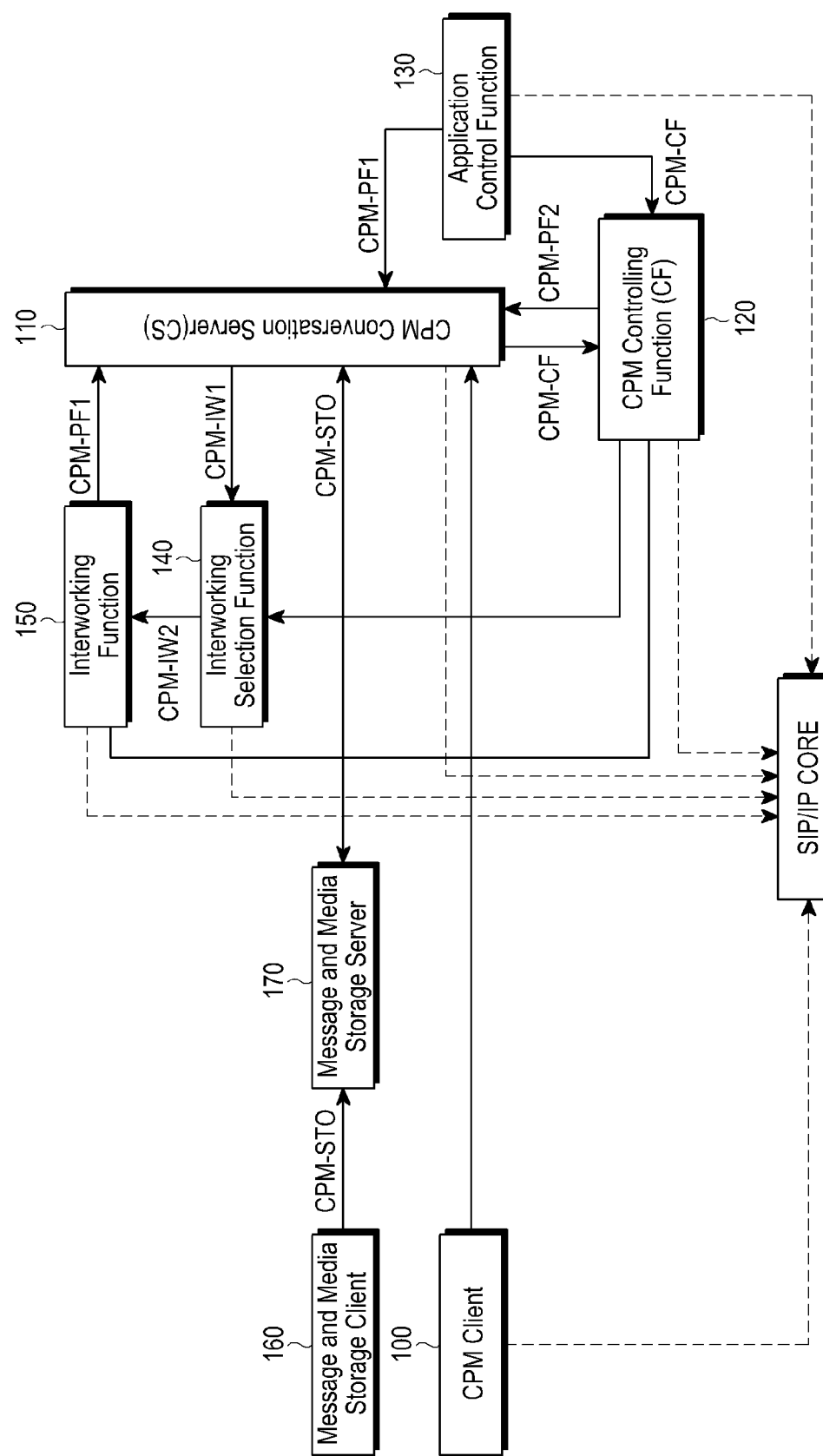
FIG. 1 is a diagram illustrating a conventional CPM system.
Figure 2:
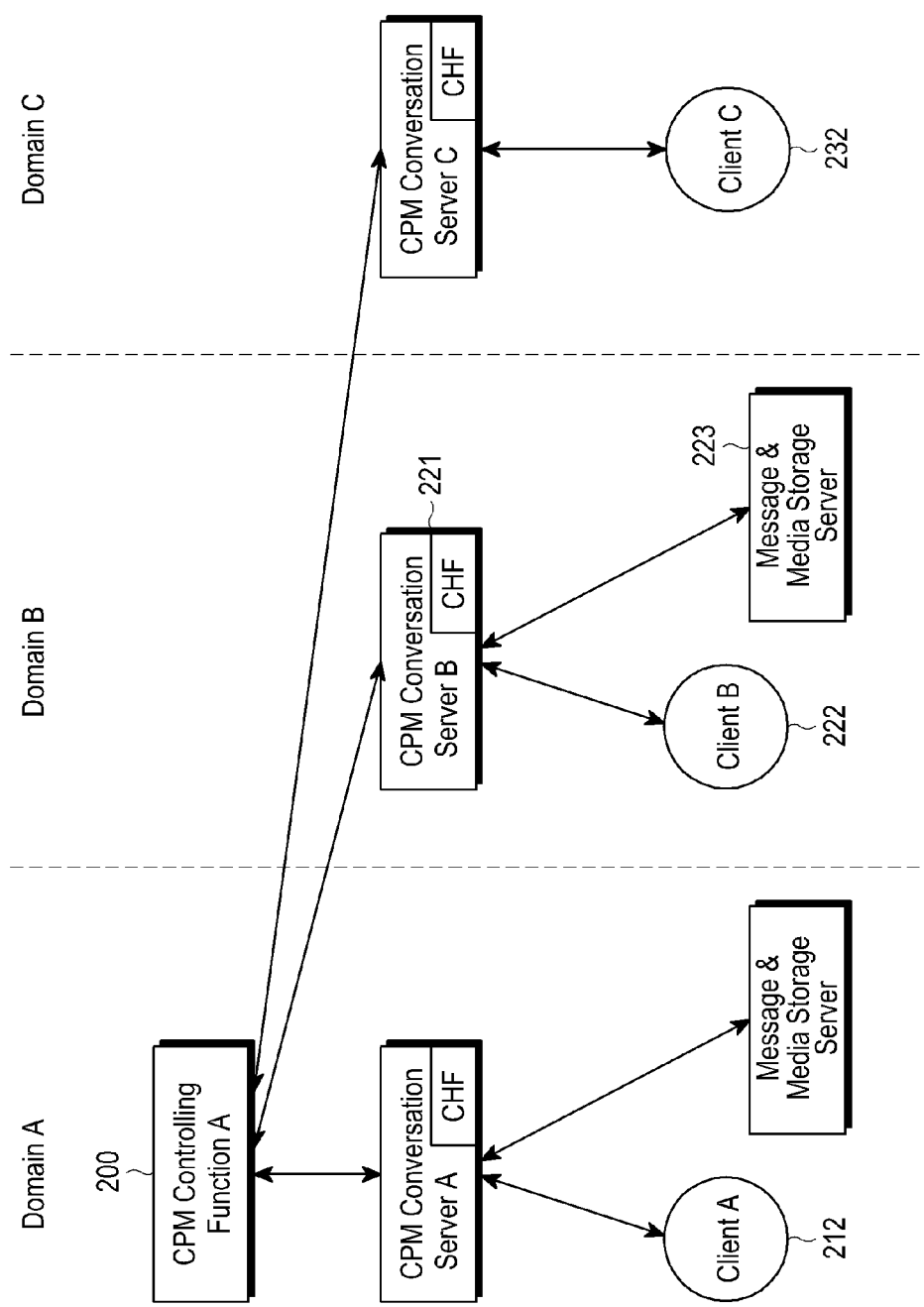
FIG. 2 is a diagram illustrating a communication system in which a CS manages a session history according to an embodiment of the present invention.

FIG. 2 illustrates a communication system in which a CS manages a session history according to an embodiment of the present invention.

Referring to FIG. 2, client A 212 in domain A and client B 222 in domain B are in a conversation with each other by creating a one-to-one session. However, client A 212 and client B 222 intend to make a group conversation by creating a group session, to which client C 232 in domain C is added, at the request of client A 212. In this case, it is assumed that a CS 221 in the domain B manages a session history.

After the group session is created, clients 212 and 232 in domains A and C, respectively request and receive a group session history from the CS 221 in group B, either directly or through another path, to acquire a group session history. The group session history may be stored in the CS 221 or an M&MS 223.

If client B 222 in domain B leaves the group session, the CS 221 may not receive the conversation-relation data, which was received from the group session. Consequently, the CS 221 will not be able to manage the group session history. In this case, a CF 200 may be required to manage a group session history.

Figure 3:
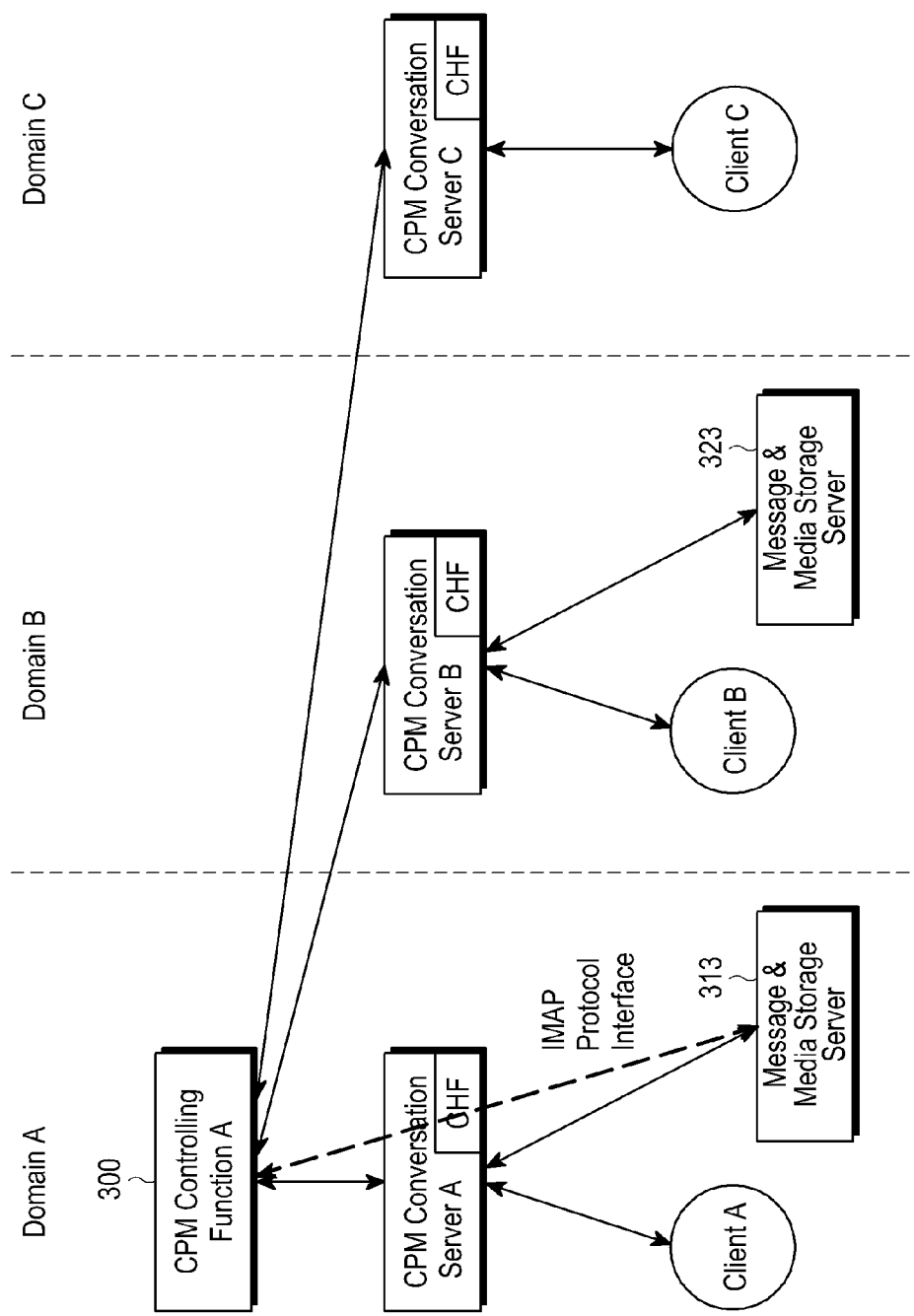
FIG. 3 is a diagram illustrating a communication system in which a CF manages a session history according to an embodiment of the present invention.

FIG. 3 illustrates a communication system in which a CF manages a session history according to an embodiment of the present invention.

Referring to FIG. 3, a CF 300 includes a CHF defined in a CS, and manages a group session history through Internet Message Access Protocol (IMAP) interfacing with an M&MS 313.

Figure 4:
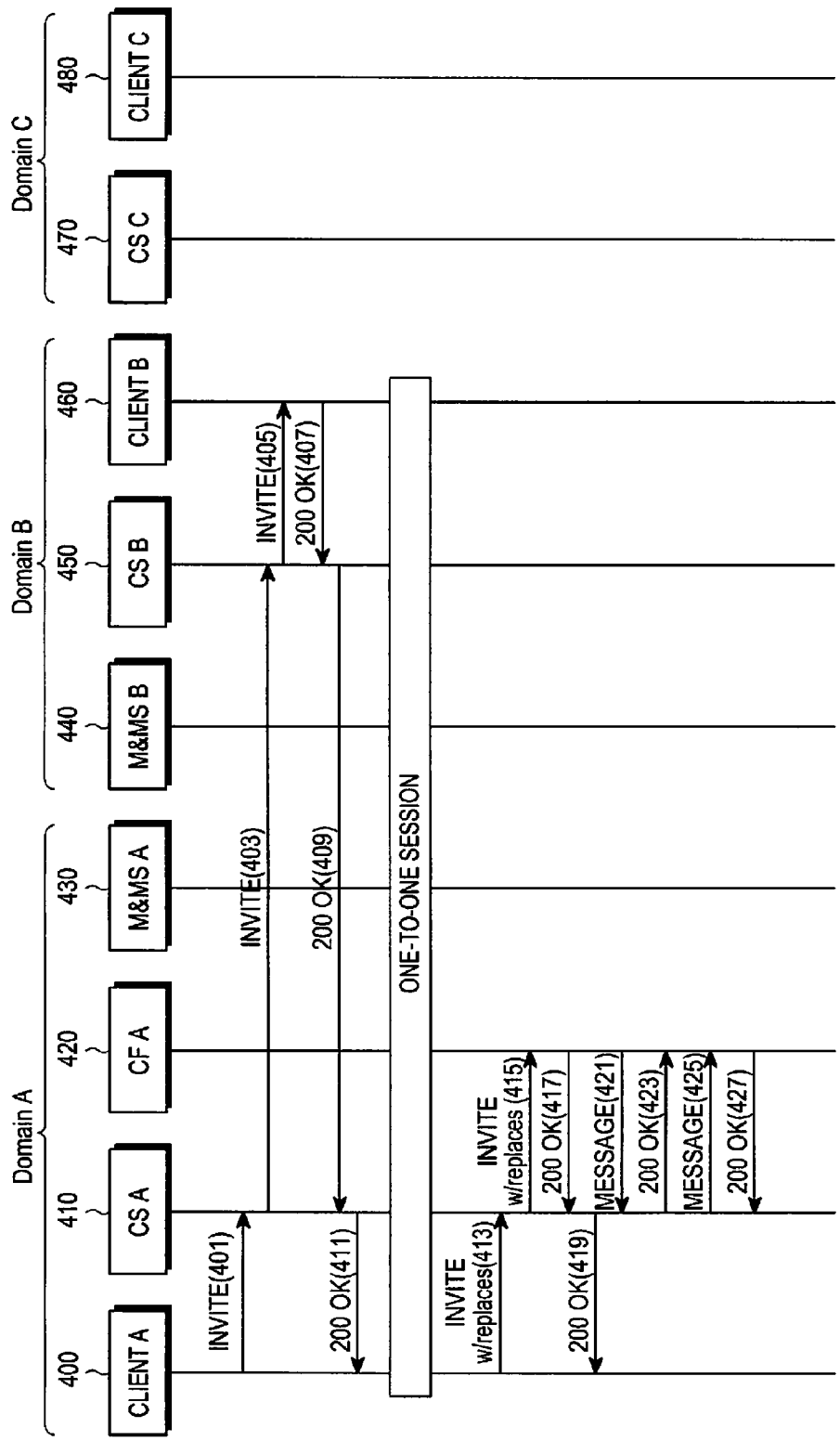
FIGS. 4 and 5 are signal flow diagrams illustrating a process of informing a CF in a domain A of a session history by a CS in a domain B in a communication system according to an embodiment of the present invention.
Figure 5:
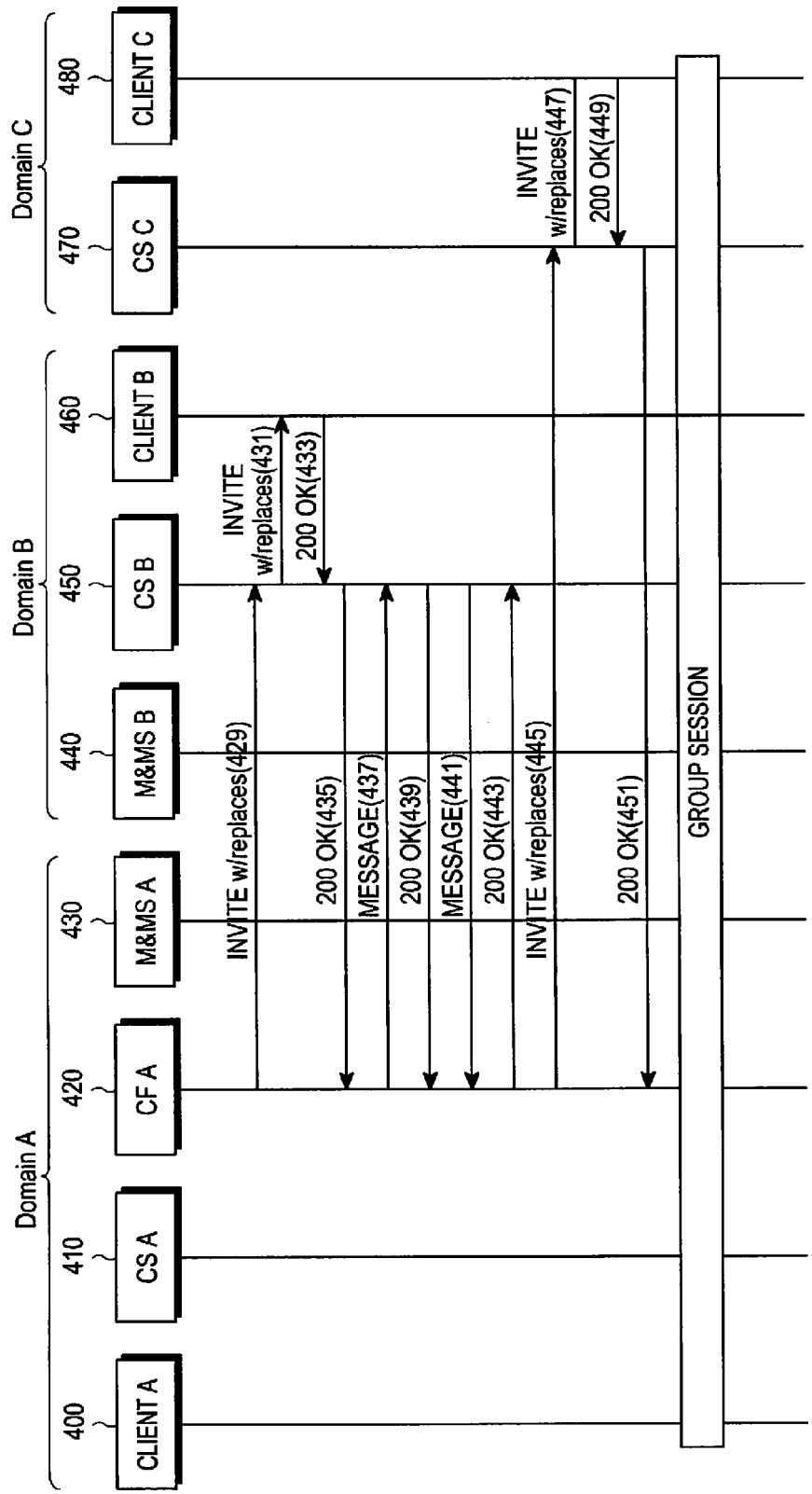

FIGS. 4 and 5 illustrate a process of informing a CF in a domain A of a session history by a CS in a domain B in a communication system according to an embodiment of the present invention.

Referring to FIGS. 4 and 5, in step 401, client A 400 in domain A sends an INVITE message to CS A 410 to create a one-to-one session to client B 460 in domain B. In step 403, CS A 410 sends the received INVITE message to CS B 450 in domain B. In step 405, CS B 450 sends the received INVITE message to client B 460. In step 407, client B 460 sends a 200 OK message to CS B 450, in response to the received INVITE message. In step 409, CS B 450 sends the received 200 OK message to CS A 410. In step 411, CS A 410 sends the received 200 OK message to client A 400. A one-to-one session between client A 400 and client B 460 is created through steps 401 to 411.

Thereafter, to change the one-to-one session with client B 460 into a group session, client A 400 exchanges an INVITE w/replaces message and a 200 OK message with CS A 410 and CFA 420 in steps 413 to 419.

In step 4221, CF A 420 sends a MESSAGE message to CS A 410. The MESSAGE message, which requests a one-to-one history session, may have the following format.

```
MESSAGE sip:CPMServerA@home.net SIP/2.0
Via: SIP/2.0/UDP cpmserver.home.net:5060
To: <sip:CPMServerA@home.net>
From: <sip:conference1@example.com>;tag=2837302775
Call-ID: 563b4c76366712
CSeq: 2030485 MESSAGE
```

```
Contact: <sip:conference1@ example.com>
Content-Length: XXX
Content-Type: application/OnetoOneSessionHistoryRequest+xml
<xml version="1.0">
<OnetoOneSessionHistoryRequest version="1.0">
    <OnetoOneSessionID> </OnetoOneSessionID>
    <RequestDeviceID> </RequestDeviceID>
</OnetoOneSessionHistoryRequest>
```

Upon receiving the MESSAGE message, CS A 410 sends a 200 OK message, which acknowledges the MESSAGE message, to CF A 420 in step 423, and in step 425, sends a MESSAGE message to CF A 420, indicating that it does not manage a one-to-one session history and instead, CS B 450 manages a one-to-one session history. In step 427 CF A 420 sends CS A 410 a 200 OK message for acknowledging the MESSAGE message sent in step 425. The MESSAGE message sent in step 425 may have the following format.

```
MESSAGE sip:conference1@example.com SIP/2.0
Via: SIP/2.0/UDP cpmserver.home.net:5060
To: <sip:conference1@example.com>;tag=2837302775
From: <sip:CPMServerA@home.net>;tag=1928301774
Call-ID: 563b4c76366712
CSeq: 2030485 MESSAGE
Contact: <sip:CPMServerA@cs.home.net>
Content-Length: XXX
Content-Type: application/OnetoOneSessionHistoryResponse+xml
<xml version="1.0">
<OnetoOneSessionHistoryResponse version="1.0">
    <OnetoOneSessionID> </OnetoOneSessionID>
    <GroupSessionID> </GroupSessionID>
    <HistoryManagementServerInfo>
        <ServerType> </ServerType>
        <ServerAddr> </ServerAddr>
        <CHFEnable> </CHFEnable>
        <CHFID> </CHFID>
    </HistoryManagementServerInfo>
    <MMSInfo>
        <M&MSAddr> </M&MSAddr>
<MailboxID> </MailboxID>
    </MMSInfo>
</OnetoOneSessionHistoryResponse>
```

To change the one-to-one session with client B 460 into a group session, CF A 420 exchanges an INVITE w/replaces message and a 200 OK message with CS A 410 and CF A 420 in steps 429 to 435.

In step 437, CF A 420 sends a MESSAGE message requesting a one-to-one session history, to CS B 450 or an entity managing a session history. The MESSAGE message sent in step 437 may have the same format as that of the MESSAGE message sent in step 421, except that "To: <sip:CPMServerA@home.net>" corresponding to a destination address is changed to "To: <sip:CPMServerB@home.net>".

In other words, OnetoOneSessionHistoryRequest of Content-Type in the MESSAGE messages used in steps 421 and 437 indicates that these messages are messages are requesting session history-related information. OnetoOneSessionID is specified in body parts of the MESSAGE messages to indicate an identifier of the one-to-one session.

Upon receiving the MESSAGE message, in step 439 CS B 450 sends a 200 OK message for acknowledging the MESSAGE message to CF A 420. In step 441, CS B 450 also sends a MESSAGE message including a one-to-one session history to CF A 420. The MESSAGE message sent in step 441 may have the same format as the MESSAGE message sent in step 425.

In other words, OnetoOneSessionHistoryResponse is indicated in Content-Type in the MESSAGE message sent in steps 425 to 441, to indicate a message carrying one-to-one session history-related information. OnetoOneSessionID, GroupSessionID, HistoryManagementServerInfo, and M&MSInfo in the body parts represent session history-related information. Dialog information (i.e., identifier information) of the existing one-to-one session is represented in OnetoOneSessionID, and dialog information of the group session is represented in GroupSessionID Information about a server managing a session history and information related to a CPM CHF managing a session history are represented in HistoryManagementServerInfo. In addition, a type of server managing a session history is specified in ServerType. When the server is a CS, 'ConversationServer' is specified, and when the server is a CF, 'ControllingFunction' is specified. Additionally, information about an SIP Uniform Resource Identifier (URI) of the server is represented in ServerAddr.

If a group session history is stored in the server, "True" is specified in CHFEnable. However, if the group session history is not stored and managed, "False" is specified in CHFEnable.

In addition, a server transmits information about a sever managing a group session history by specifying a unique ID of a CHF managing a group session history. For example, if M&MS A 430 manages a session history of a group session, an address of M&MS A 430 and a mail box address of the session history are specified in M&MSAddr and MailboxID, respectively. However, if M&MS A 430 does not manage a session history of a group session, Null is specified.

Upon receiving the MESSAGE message, in step 435, CF A 420 sends a 200 OK message for acknowledging the MESSAGE message, to CS B 450.

In step 437, to invite client C 480 in domain C to the group session, CF A 420 sends an INVITE w/replaces message to CS C 470. Upon receiving the INVITE w/replaces message, CS C 470 sends the received INVITE w/replaces message to client C 480 in step 439. In step 441, client C 480 sends a 200 OK message to CS C 470, in response to the INVITE w/replaces message, and in step 442, CS C 470 sends the received 200 OK message to CF A 420. As step 443 is completed, a group session that clients A 400, B 460, and C 480 have joined is created.

Figure 6:
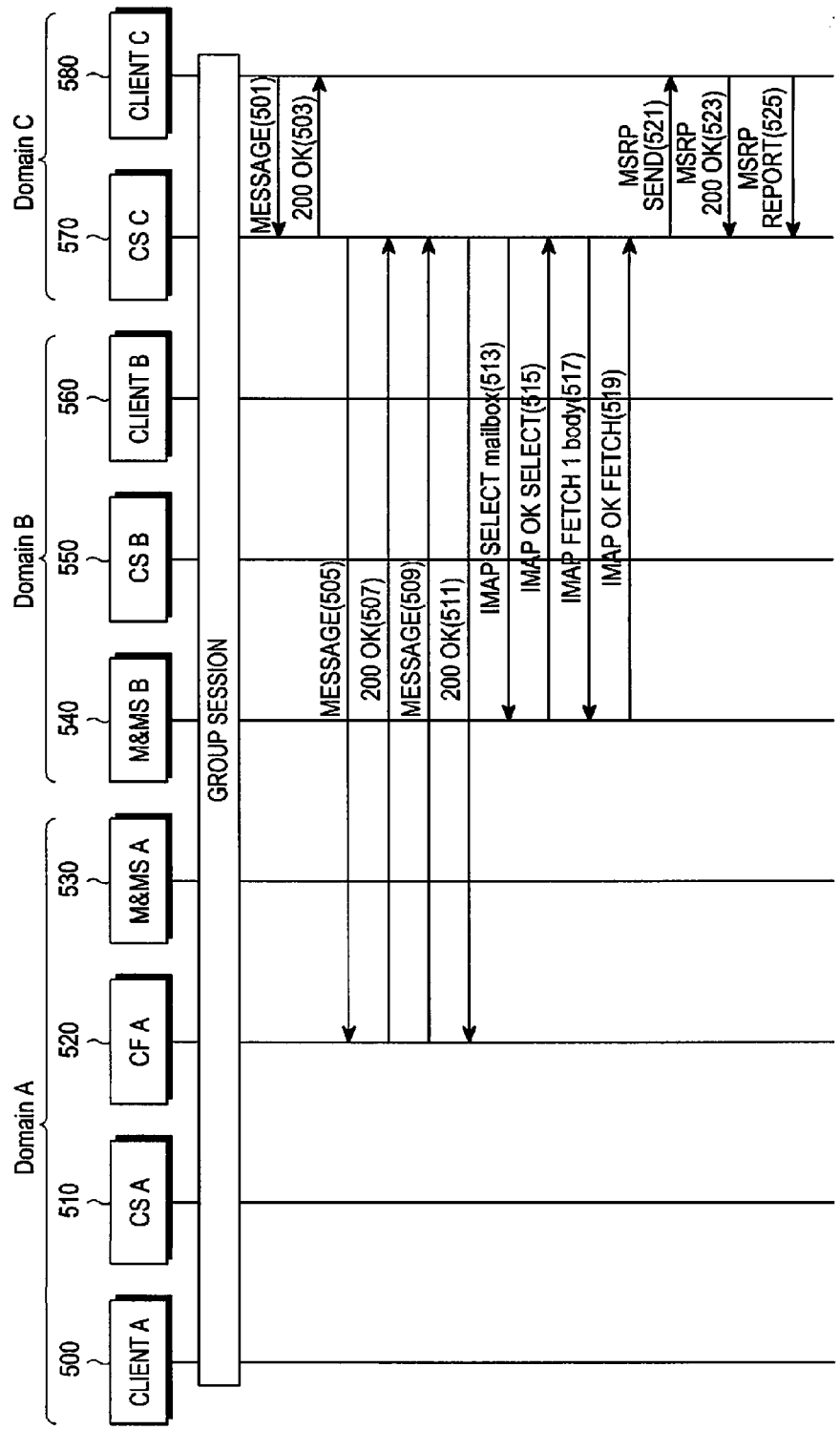
FIG. 6 is a signal flow diagram illustrating a process of transmitting a group session history to a CF A by a CS B in a communication system according to an embodiment of the present invention.

FIG. 6 illustrates a process of transmitting a group session history to a CF A by a CS B in a communication system according to an embodiment of the present invention.

Referring to FIG. 6, a group session is created among clients A 500, B 560, and C 580 in domains A, B and C, respectively, and client C 580 requests a group session history by sending a MESSAGE message to CS C 570 in step 501. The MESSAGE message requesting a group session history in step 501, for example, has the following format.

```
MESSAGE sip:conference1@example.com SIP/2.0
Via: SIP/2.0/UDP cpmserver.home.net:5060
To: <sip:CPMServerC@home.net>
From: <sip:CPM-ClientC@homeC.net>;tag=19237234
Call-ID: 563b4c76366712
CSeq: 2030485 MESSAGE
Contact: <sip:CPM-ClientC@pc.homeC.net>
Content-Length: XXX
```

-continued

```
Content-Type: application/GroupSessionHistoryRequest+xml
<xml version="1.0">
<GroupSessionHistoryRequest version="1.0">
    <GroupSessionID> </GroupSessionID>
    <RequestDeviceID> </RequestDeviceID>
</GroupSessionHistoryRequest>
```

ClientGroupSessionHistoryRequest of Content-Type in the MESSAGE message indicates that the MESSAGE message is for requesting transmission of a group session history. GroupSessionID is specified in a body part to compose a session history transmit request message for a subscriber. That is, GroupSessionID corresponding to an identifier of a group session indicates information about a group session by representing dialog information of the group session.

In step 503, CS C 570 sends a 200 OK message for acknowledging the group session history request to client C 580.

In step 505, CS C 570 requests a group session history from CF A 520. In step 507, CF A 520 sends a 200 OK message for acknowledging the request to CS C 570. CF A 520 knows in advance that CS B 550 is managing the group session history, as illustrated in steps 429 to 435 of FIG. 5. Therefore, in step 509, CF A 520 sends a MESSAGE message to the CS C 570, indicating that CS B 550 is managing the group session history. For example, the MESSAGE message used in step 509 may have the following format.

```
MESSAGE sip:CPMServerC@home.net SIP/2.0
Via: SIP/2.0/UDP cpmserver.home.net:5060
To: <sip:CPMServerC@home.net>;tag=19237234
From: <sip:conference1@example.com>;tag=2837302775
Call-ID: 563b4c76366712
CSeq: 2030485 MESSAGE
Contact: <sip:conference1@ example.com>
Content-Length: XXX
Content-Type: application/GroupSessionHistoryResponse+xml
<xml version="1.0">
<GroupSessionHistoryResponse version="1.0">
    <OnetoOneSessionID> </OnetoOneSessionID>
    <GroupSessionID> </GroupSessionID>
    <HistoryManagementServerInfo>
        <ServerType> </ServerType>
        <ServerAddr> </ServerAddr>
        <CHFEnable> </CHFEnable>
        <CHFID> </CHFID>
    </HistoryManagementServerInfo>
    <MMSInfo>
        <M&MSAddr> </M&MSAddr>
        <MailboxID> </MailboxID>
    </MMSInfo>
</GroupSessionHistoryResponse>
```

In step 511, in response to the received MESSAGE message, CS C 570 sends a 200 OK message to CF A 520.

Further, upon receiving the MESSAGE message in step 509, CS C 570 recognizes that the group session history is stored in M&MS B 540, and requests and receives the group session history through IMAP interfacing with M&MS B 540 in steps 513 to 519. The messages exchanged between CS C 570 and M&MS B 540 include an IMAP SELECT mailbox message, an IMAP OK SELECT message, an IMAP FETCH 1 body message, and an IMAP OK FETCH message in steps 513 to 519, respectively.

After acquiring the group session history, CS C 570 transmits the acquired group session history to client C 580 using an MSRP protocol in steps 521 to 525.

Figure 7:
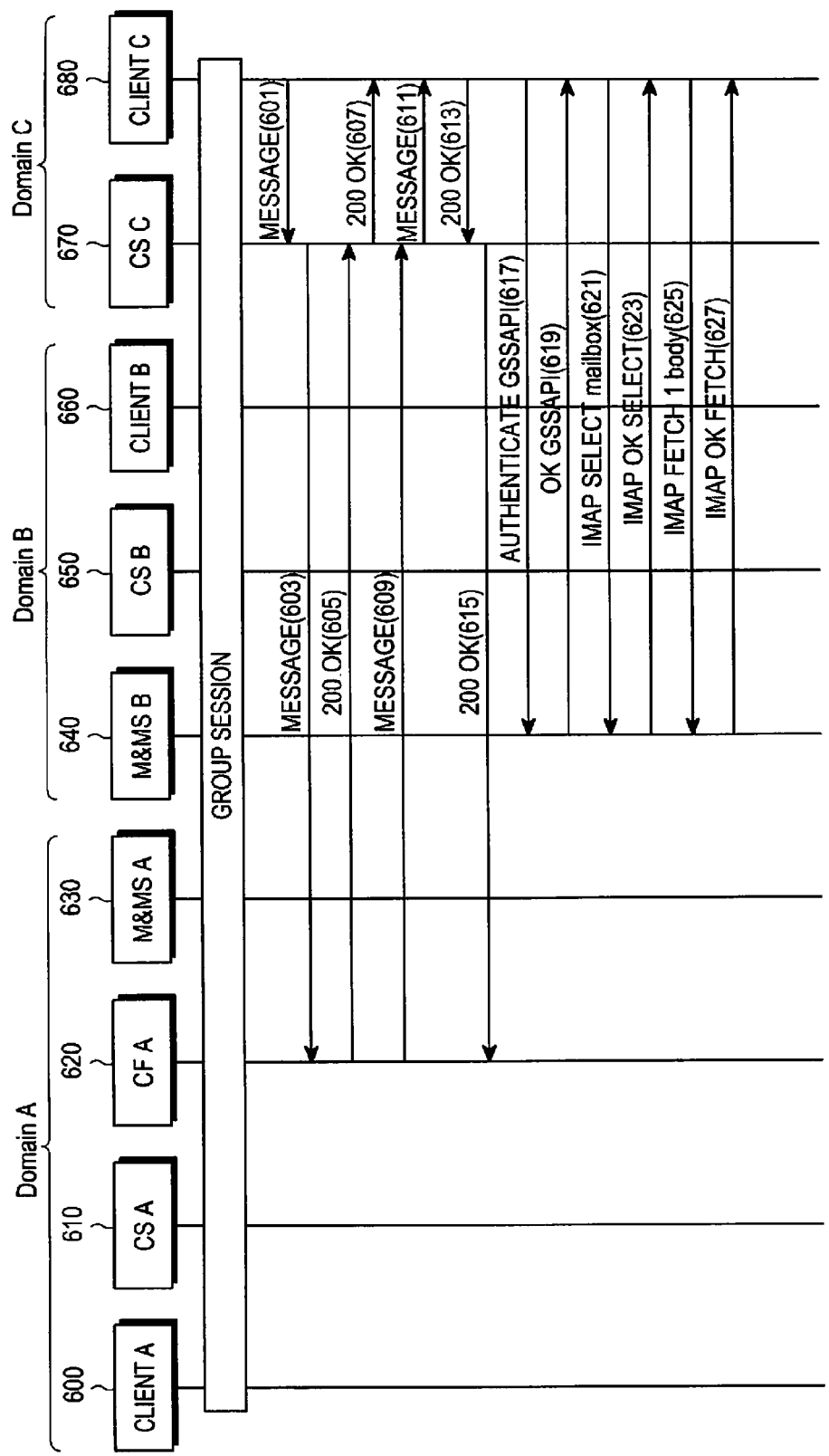
FIG. 7 is a signal flow diagram illustrating a process of acquiring a group session history by a client C in a communication system according to an embodiment of the present invention.

FIG. 7 illustrates a process of acquiring a group session history by a client C in a communication system according to an embodiment of the present invention.

Referring to FIG. 7, in step 601, client C 680 in domain C sends a MESSAGE message to CS C 670, requesting a group session history. CS C 670 requests a group session history from CF A 620 using the MESSAGE message in step 603. In step 605, CF A 620 sends a 200 OK message to CS C 670, acknowledging the MESSAGE message. In step 607, CS C 670 sends a 200 OK message to client C 680, acknowledging the MESSAGE message used in step 601.

In step 609, CF A 620 sends a MESSAGE message to CS C 670. The MESSAGE message in step 609 may include access information for CS B 650 and M&MS B 640, which manage and store a group session history.

Based on the MESSAGE message received from CF A 620, CS C 670 transmits access information for the group session history, to client C 680 in step 611. In step 613, client C 680 sends a 200 OK message to the CS C 670, acknowledging the MESSAGE message. In step 615 CS C 670 sends a 200 OK message to CF A 620.

Based on the acquired access information, in step 617, client C 680 sends an AUTHENTICATE Generic Security Services Application Program Interface (GSSAPI) message to M&MS B 640, in which the group session history is stored. The AUTHENTICATE GSSAPI message that client C 680 uses to log into M&MS B 640. In step 619, M&MS B 640 sends an OK GSSAPI message indicating the log-in of client C 680, to client C 680. In steps 621 to 627, client C 680, which is logged into M&MS B 640, acquires a group session history from M&MS B 640, similar to steps 513 to 519 of FIG. 6.

Figure 8:
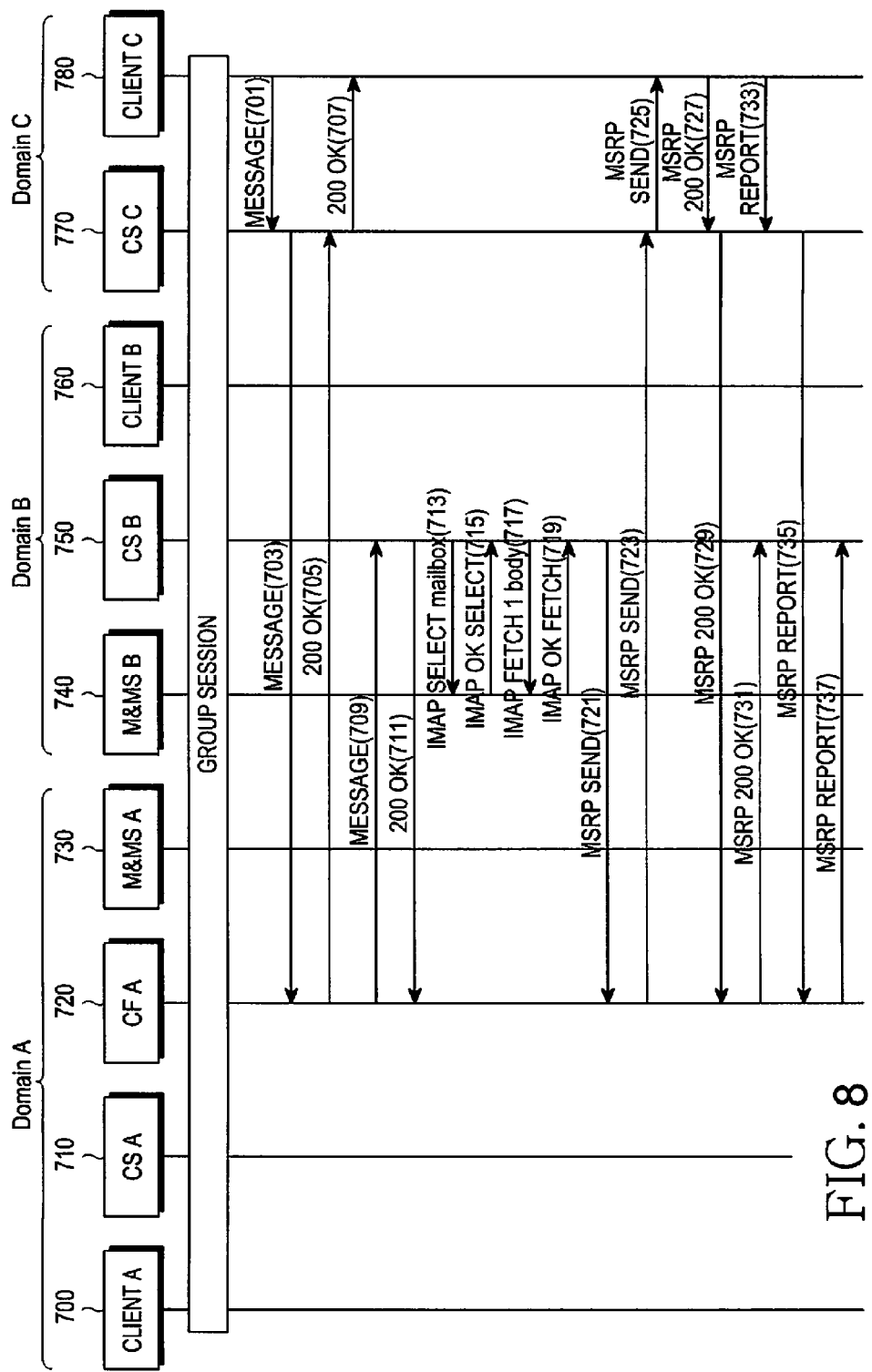
FIG. 8 is signal flow a diagram illustrating a process of acquiring a group session history by a client C in a communication system according to an embodiment of the present invention.

FIG. 8 illustrates a process of acquiring a group session history by a client C in a communication system according to an embodiment of the present invention.

Referring to FIG. 8, steps 701 to 707 are equivalent to steps 601 to 607 of FIG. 7, as described above. Accordingly, a detailed description of steps 701 to 707 will be omitted.

In step 709, CF A 720 in domain A requests a group session history from CS B 750, using a MESSAGE message. In step 711, CS B 750 sends a 200 OK message to CF A 720, acknowledging the MESSAGE message. For example, the MESSAGE message sent in step 709 may have the following format.

```
MESSAGE sip:conference1@example.com SIP/2.0
Via: SIP/2.0/UDP cpmserver.home.net:5060
To: <sip:conference1@example.com>;tag=2837302775
From: <sip:CPMServerB@home.net>;tag=1852424756
Call-ID: 563b4c76366712
CSeq: 2030485 MESSAGE
Contact: <sip:CPM-ServerB@cs.homeB.net>
Content-Length: XXX
Content-Type: application/GroupSessionHistorySendRequest+xml
<xml version="1.0">
<GroupSessionHistoryRequest version="1.0">
    <GroupSessionID> </GroupSessionID>
    <SendingDeviceID> </SendingDeviceID>
</GroupSessionHistoryRequest>
```

GroupSessionHistorySendRequest is represented in Content-Type in the MESSAGE message to indicate an intension to transmit a group session history to a specific client. A body part includes OnetoOneSessionID, GroupSessionID, and SendingDeviceID. The OnetoOneSessionID represents dialog information of the existing one-to-one session. GroupSessionID indicates information about a group session by representing dialog information of the group session.

Each of or both of a one-to-one session history and a group session history may be fetched with OnetoOneSessionID and GroupSessionID By specifying host information for client C 780 in domain C in SendingDeviceID, CF A 720 may request CS B 750 in domain B to transmit the session history it is managing, to client C 780.

In steps 713 to 719, CS B 750 acquires a group session history by communicating with M&MS B 740, in which the group session history is stored, using an IMAP protocol. Steps 713 to 719 are similar to steps 513 to 519 of FIG. 6, as described above. Accordingly, a detailed description of steps 713 to 719 will be omitted.

In step 721, CS B 750 transmits the acquired group session history to CF A 720 using an MSRP SEND message.

In step 723, CF A 720 transmits the group session history acquired from CS B 750 to CS C 770 using an MSRP SEND message. In step 725, CS C 770 sends the MSRP SEND message including the group session history to client C 780. In step 727, client C 780 sends an MSRP 200 OK message to the CS C 770, acknowledging the MSRP SEND message. In step 729, CS C 770 sends an MSRP 200 OK message to CS A 710, acknowledging the MSRP SEND message received in step 723. In step 731, CF A 720 sends an MSRP 200 OK message to the CS B 750, acknowledging the MSRP SEND message used in step 721.

In step 733, client C 780 sends an MSRP REPORT message indicating acquisition of the group session history to CS C 770. In step 735, CS C 770 sends the received MSRP REPORT message to CF A 720, and in step 737, CF A 720 sends the received MSRP REPORT message to CS B 750.

Figure 9:
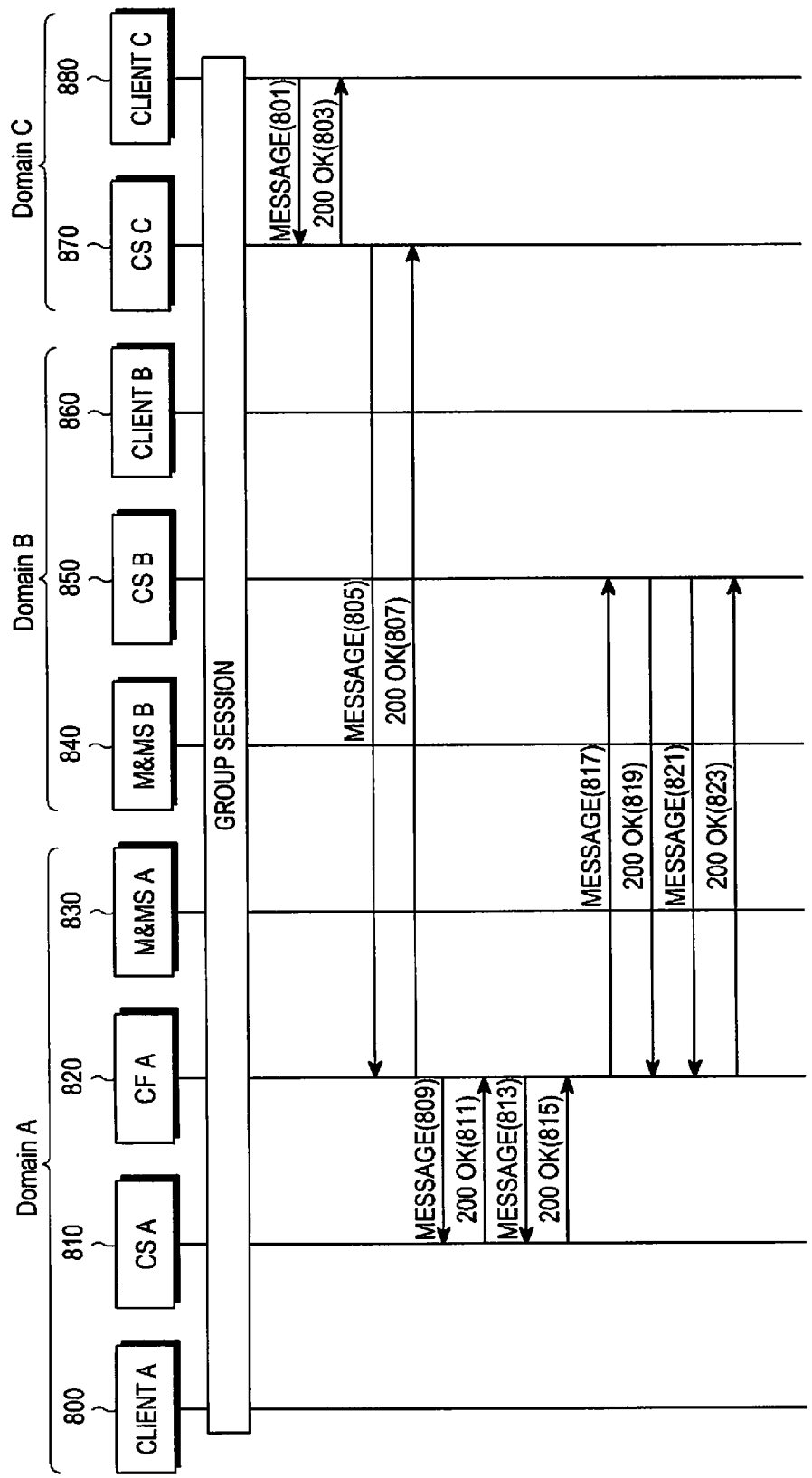
FIGS. 9 and 10 are signal flow diagrams illustrating a process of transmitting a group session history to a client C by a CS C in a communication system according to an embodiment of the present invention.
Figure 10:
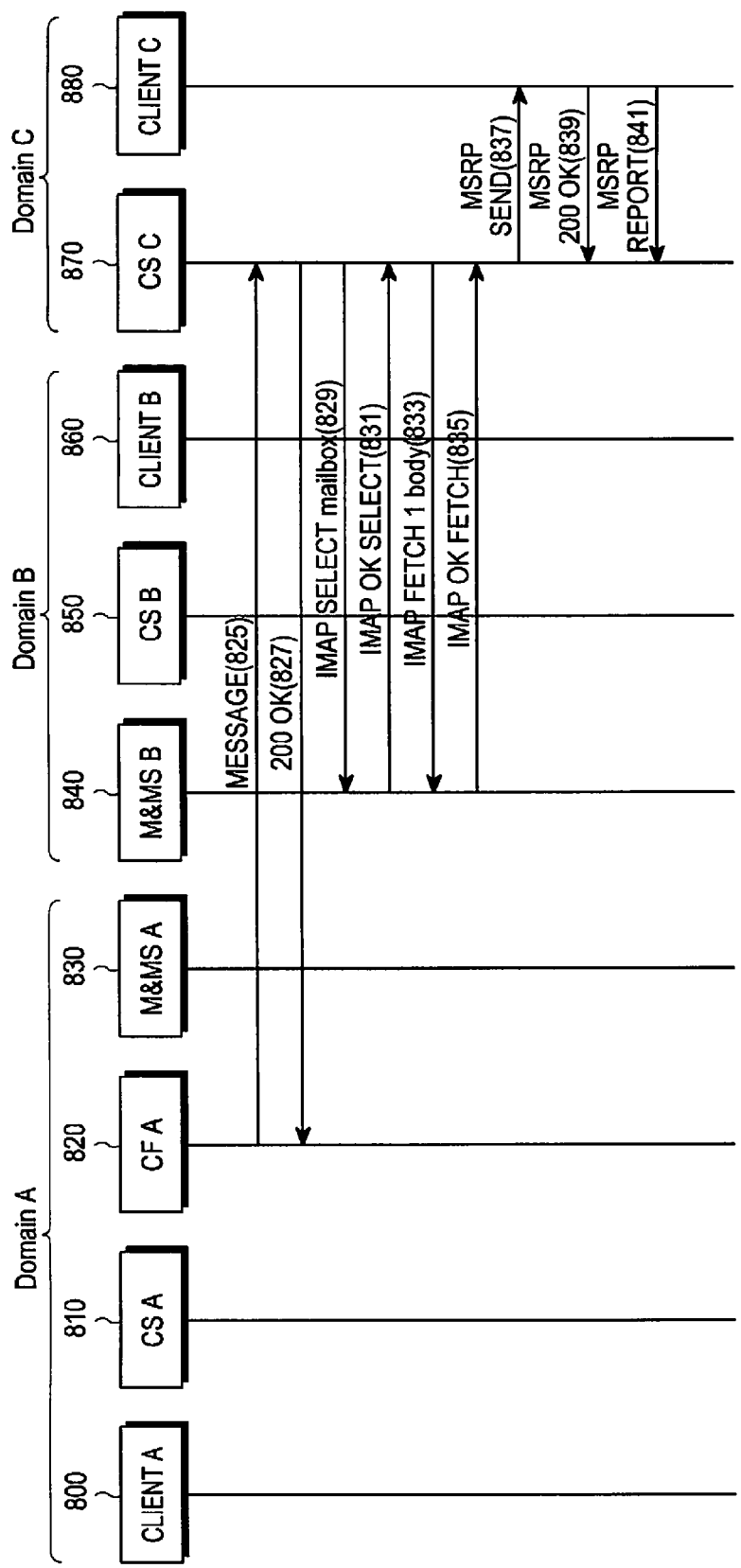

FIGS. 9 and 10 illustrate a process of transmitting a group session history to a client C by a CS C in a communication system according to an embodiment of the present invention.

Referring to FIGS. 9 and 10, in step 801, client C 880 requests a group session history from CS C 870, using a MESSAGE message. In step 803, CS C 870 sends a 200 OK message to client C 880, acknowledging the MESSAGE message. In step 805, CS C 870 requests a group session history from CF A 820, using a MESSAGE message. In step 807, CF A 820 sends a 200 OK message to CS C 870, acknowledging the MESSAGE message received in step 805.

In steps 809 to 815, CF A 820 requests a group session history from CS A 810 and receives a response thereto. If CS A 810 is managing information on the group session history, it sends a MESSAGE message including the group session history to CF A 820. However, if CS A 810 is not managing the group session history, it sends, to CF A 820, either a MESSAGE message with no information included in its body, or a MESSAGE message in which an entity managing the group session history is specified.

In step 817, CF A 820 sends a MESSAGE message for requesting a group session history to CS B 850, which is managing the group session history. In step 819, CS B 850 sends a 200 OK message to CF A 820, acknowledging the MESSAGE message received in step 817. In addition, in step 821, CS B 850 sends a MESSAGE message to CF A 820 indicating that the group session history is stored in M&MS B 840. In step 823, CF A 820 sends a 200 OK message to CS B 850, acknowledging the MESSAGE message received in step 821.

Further, in step 825, CF A 820 sends a MESSAGE message for requesting a group session history to CS C 870.

In step 827, CS C 870 sends a 200 OK message to CF A 820, acknowledging the MESSAGE message received in step 825.

Thereafter, in steps 829 to 835, CS C 870 acquires a group session history by communicating with M&MS B 840 using an IMAP protocol. After acquiring the group session history, CS C 870 transmits the acquired group session history to client C 880 using an MSRP protocol and receives a response thereto in steps 837 to 841.

Figure 11:
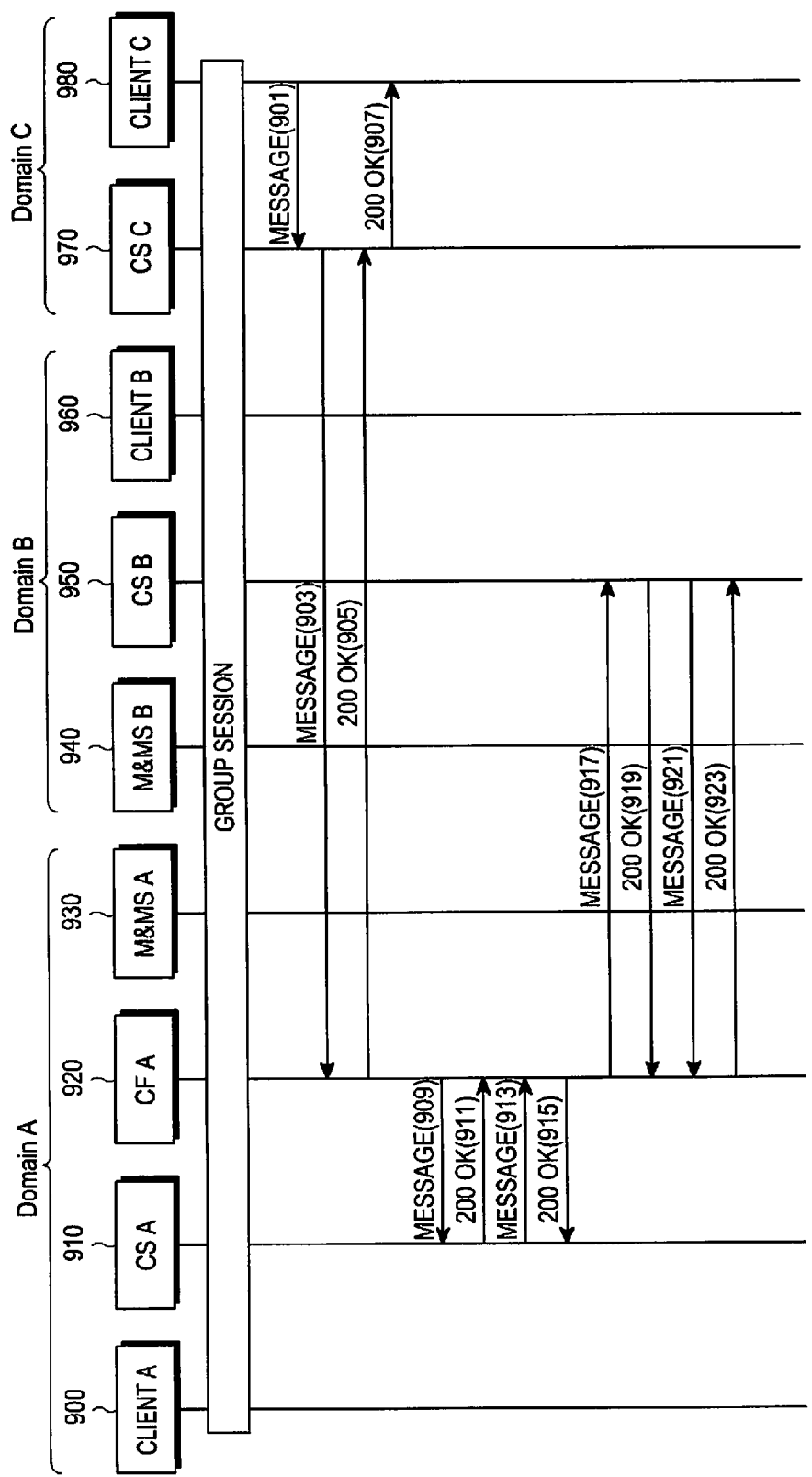
FIGS. 11 and 12 are signal flow diagrams illustrating a process of acquiring a group session history from an M&MS B by a client C in a communication system according to an embodiment of the present invention.
Figure 12:
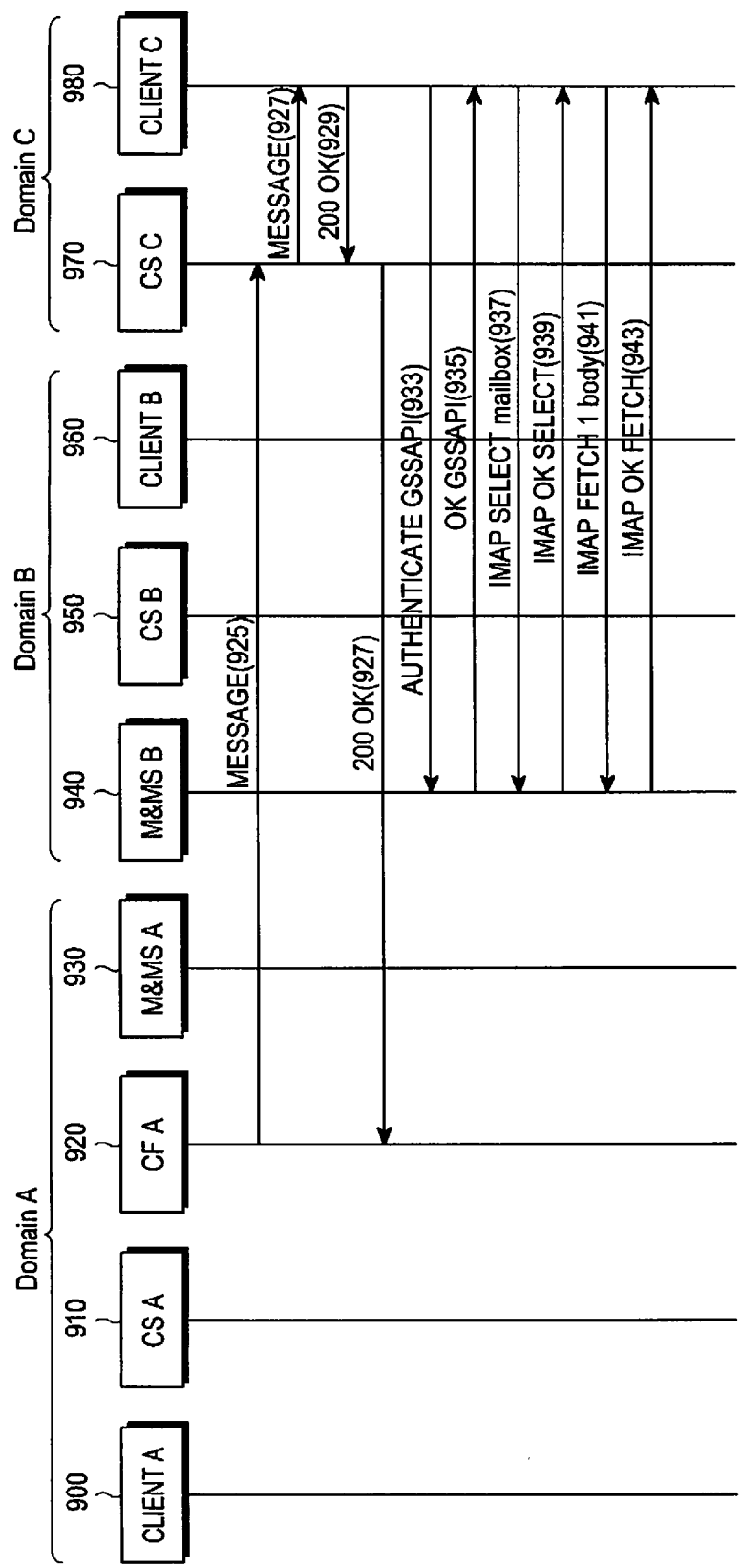

FIGS. 11 and 12 illustrate a process of acquiring a group session history from an M&MS B by a client C in a communication system according to an embodiment of the present invention.

Referring to FIGS. 11 and 12, steps 901 to 907 are equivalent to steps 701 to 707 of FIG. 8, and steps 909 to 925 are equivalent to steps 809 to 825 of FIG. 9. Accordingly, a detailed description of steps 901 to 925 will be omitted.

In step 927, CS C 970 transmits access information for M&MS B 940, in which a group session history is stored, to client C 980 using a MESSAGE message. In step 929, client C 980 sends a 200 OK message to CS C 970, in response to the MESSAGE message. In step 931, CS C 970 sends a 200 OK message to CF A 920, in response to the MESSAGE message received in step 925.

Thereafter, in steps 933 to 943, client C 980 acquires a group session history by exchanging a series of messages with M&MS B 940. Steps 933 to 943 are equivalent to steps 617 to 627 of FIG. 7, as described above. Accordingly, a detailed description of steps 933 to 943 will be omitted.

Figure 13:
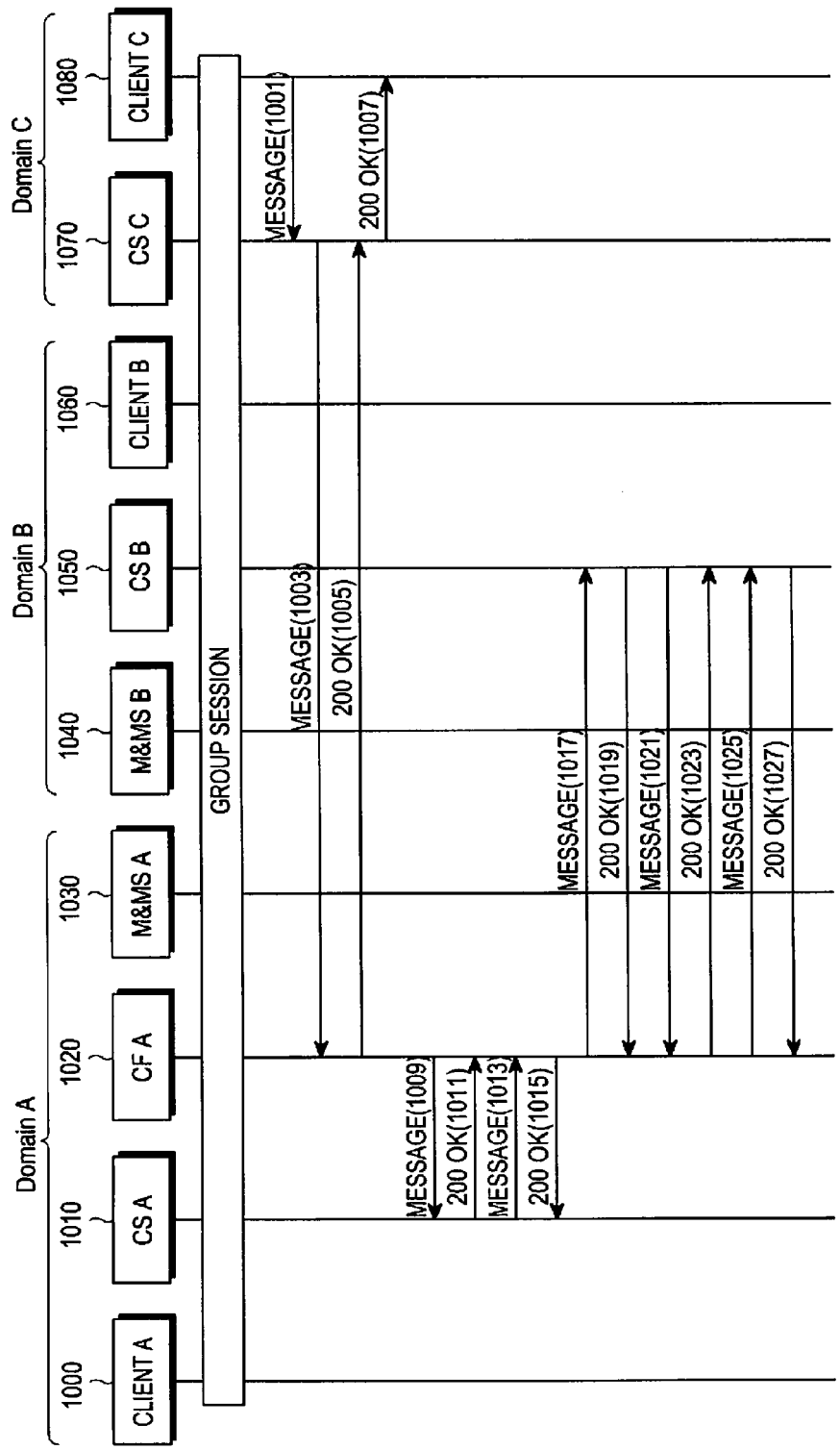
FIGS. 13 and 14 are signal flow diagrams illustrating a process of acquiring a group session history by a client C in a communication system according to an embodiment of the present invention.
Figure 14:
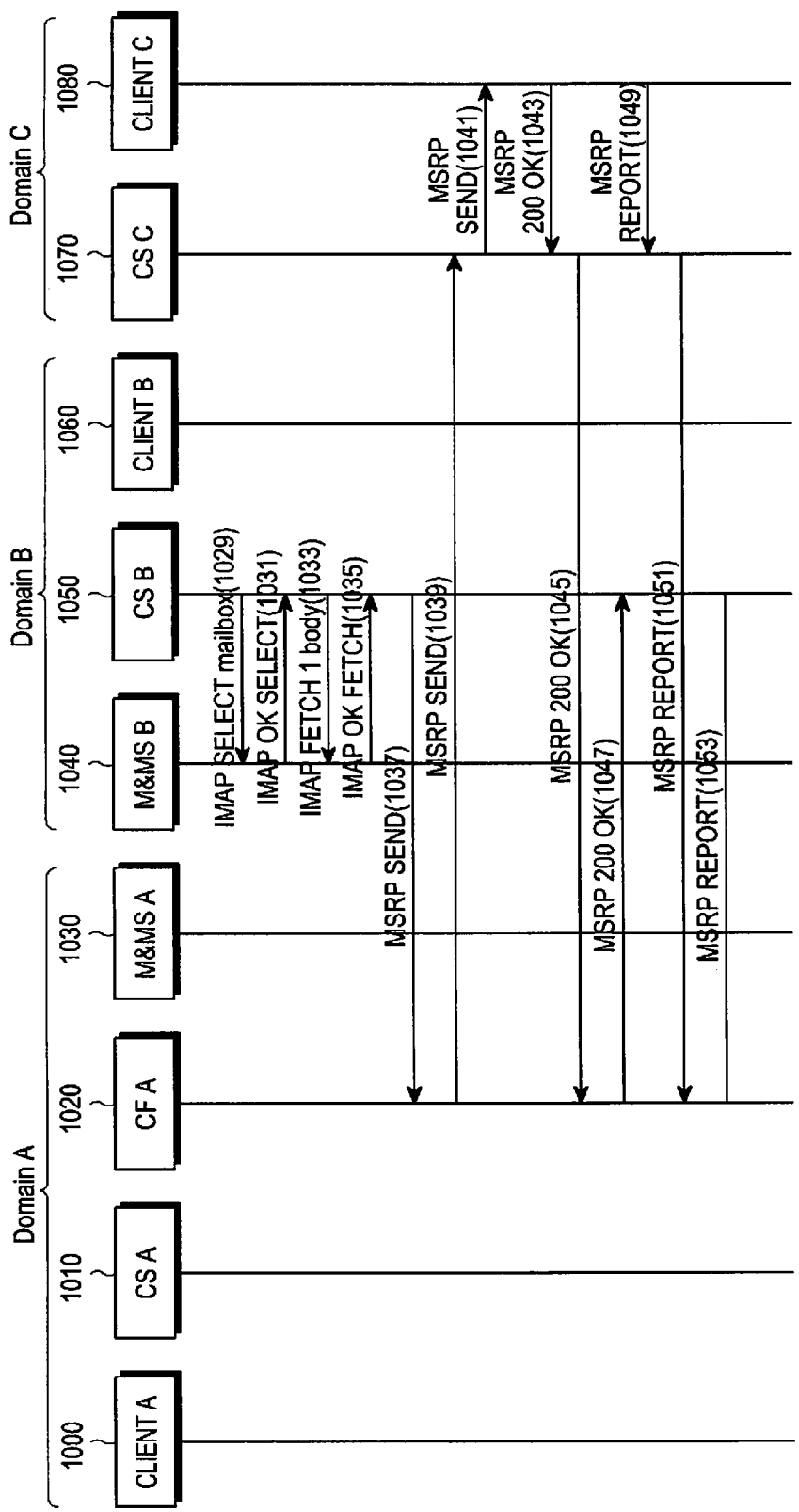

FIGS. 13 and 14 illustrate a process of acquiring a group session history by a client C in a communication system according to an embodiment of the present invention.

Referring to FIGS. 13 and 14, steps 1001 to 1023 are equivalent to steps 901 to 923 of FIG. 11, as described above. Accordingly, a detailed description of steps 1001 to 1023 will be omitted.

In step 1025, by sending a MESSAGE message to CS B 1050, CF A 1020 requests CS B 1050 to transmit a group session history to CF A 1020. In step 1027, CS B 1050 sends a 200 OK message to CF A 1010, in response to the MESSAGE message. Thereafter, in steps 1029 to 1035, CS B 1050 acquires a group session history by communicating with M&MS B 1040, in which the group session history is stored, using an IMAP protocol.

In step 1037, CS B 1050 transmits the acquired group session history to CF A 1020 using an MSRP SEND message. In step 1039, CF A 1020 transmits the group session history acquired from CS B 1050 to CS C 1070. In step 1041, CS C 1070 sends an MSRP SEND message including the group session history to client C 1080. In step 1043, client C 1080 sends an MSRP 200 OK message to CS C 1070, in response to the MSRP SEND message in step 1041. In step 1045, CS C 1070 sends an MSRP 200 OK message to CF A 1020, in response to the MSRP SEND message received in step 1039.

In step 1047, CF A 1020 sends an MSRP 200 OK message to CS B 1050, in response to the MSRP SEND message received in step 1037. In step 1049, client C 1080 sends an MSRP REPORT message indicating its acquisition of the group session history to CS C 1070. In step 1051, CS C 1070 sends the MSRP REPORT message received from client C 1080 to CF A 1020, and in step 1053, CF A 1020 sends the received MSRP REPORT message to CS B 1050.

Figure 15:
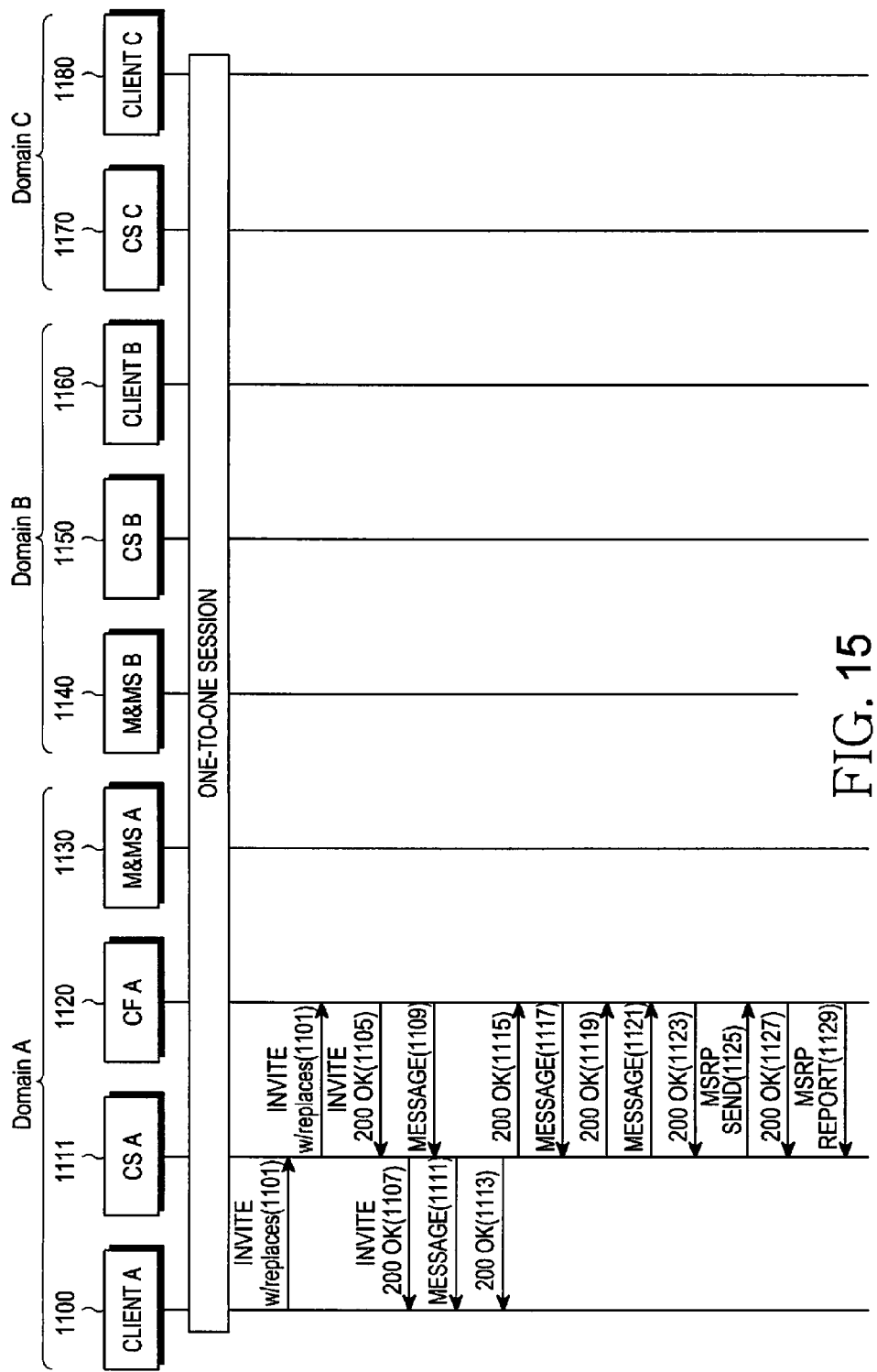
FIGS. 15 and 16 are signal flow diagrams illustrating a process of transmitting a session history until a group session is created in a one-to-one session in a communication system according to an embodiment of the present invention.
Figure 16:
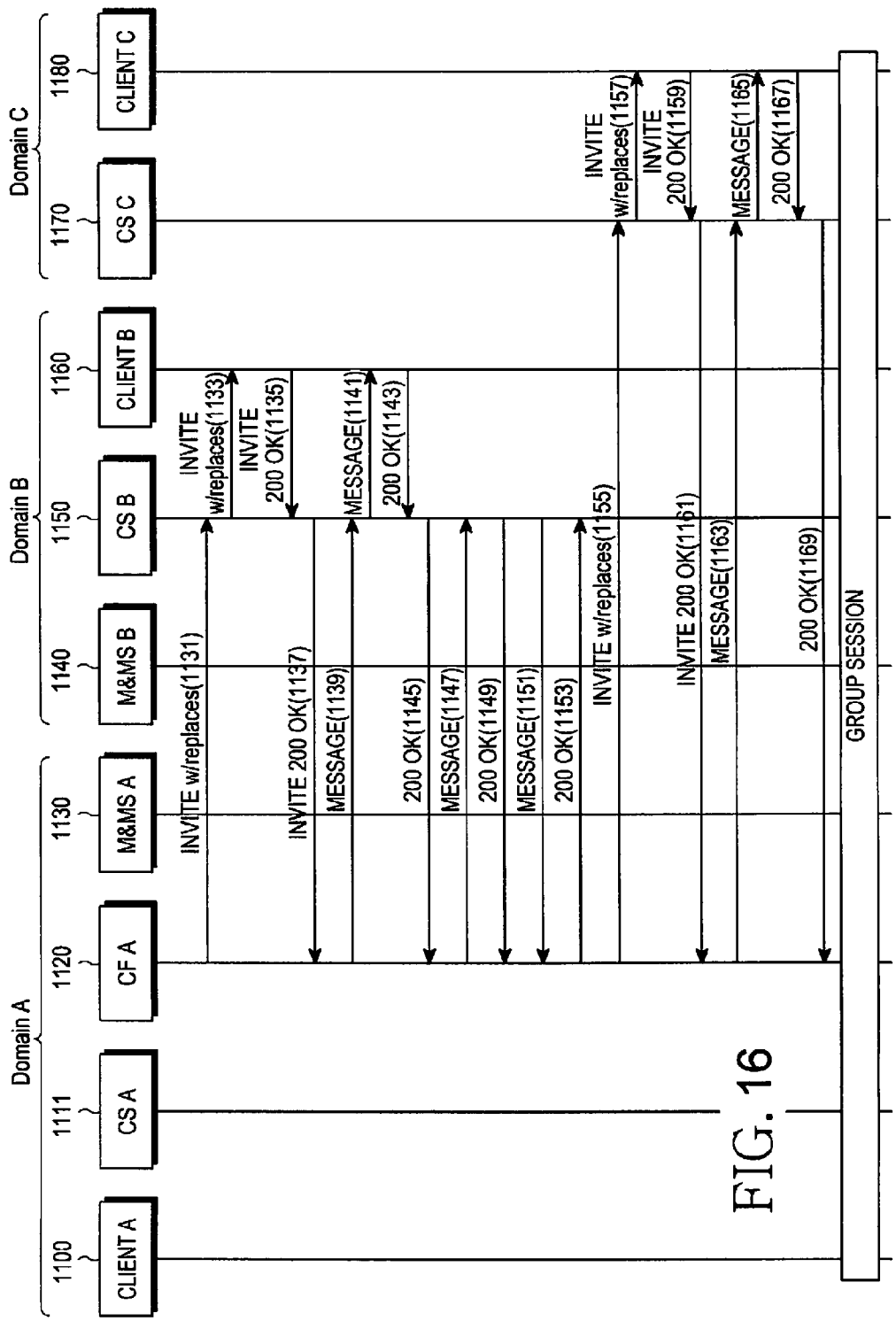

FIGS. 15 and 16 illustrate a process of transmitting a session history until a group session is created in a one-to-one session in a communication system according to an embodiment of the present invention.

Referring to FIGS. 15 and 16, a one-to-one session is created between client A 1100 and client B 1160. Thereafter, in step 1101, client A 1100 sends an INVITE w/replaces message to CS A 1110, creating a group session. In steps 1103 and 1105 CS A 1110 exchanges INVITE w/replaces and 200 OK messages with CF A 1120. In step 1107, CS A 1110 sends a 200 OK message to client A 1100, in response to the INVITE w/replaces message received in step 1101.

Thereafter, in step 1109, CS A 1110 receives a MESSAGE message from CF A 1120. For example, the MESSAGE message received by CS A 1110 may have the following format.

```
MESSAGE sip:CPM-ClientA@example.com SIP/2.0
Via: SIP/2.0/UDP cpmserver.home.net:5060
To: <sip:conference1@example.com>;tag=2837302775
From: <sip:CPMServerA@home.net>;tag=1928301774
Call-ID: 563b4c76366712
CSeq: 2030485 MESSAGE
Contact: <sip:conference1@example.com>
Content-Length: XXX
Content-Type: application/UserNotifiaction+xml
<xml version="1.0">
<UserNotification version="1.0">
    <ManagementServerMsg> </ManagementServerMsg>
</UserNotifiaction>
```

The MESSAGE message is used in the same way in steps 1111, 1139, 1141, 1163 and 1165. UserNotification, which indicates that the data exchanged to manage a session history is stored, is represented in Content-Type of the MESSAGE. ManagementServerMsg is represented in the MESSAGE message body, indicating that CF A 1120 will manage a session history.

In step 1111, CS A 1110 sends the MESSAGE message to client A 1100, and in response thereto, in step 1113, receives a 200 OK message from client A 1100. In step 1115, CS A 1110 receives a 200 OK message in response to the MESSAGE message received in step 1109.

Thereafter, in steps 1117 to 1129, CF A 1120 acquires a session history by communicating with CS A 1110. Having acquired the session history, CF A 1120 acquires a session history from CS B 1150 through a series of processes, and creates a group session with client B 1160 and client C 1180 in steps 1131 to 1169.

Figure 17:
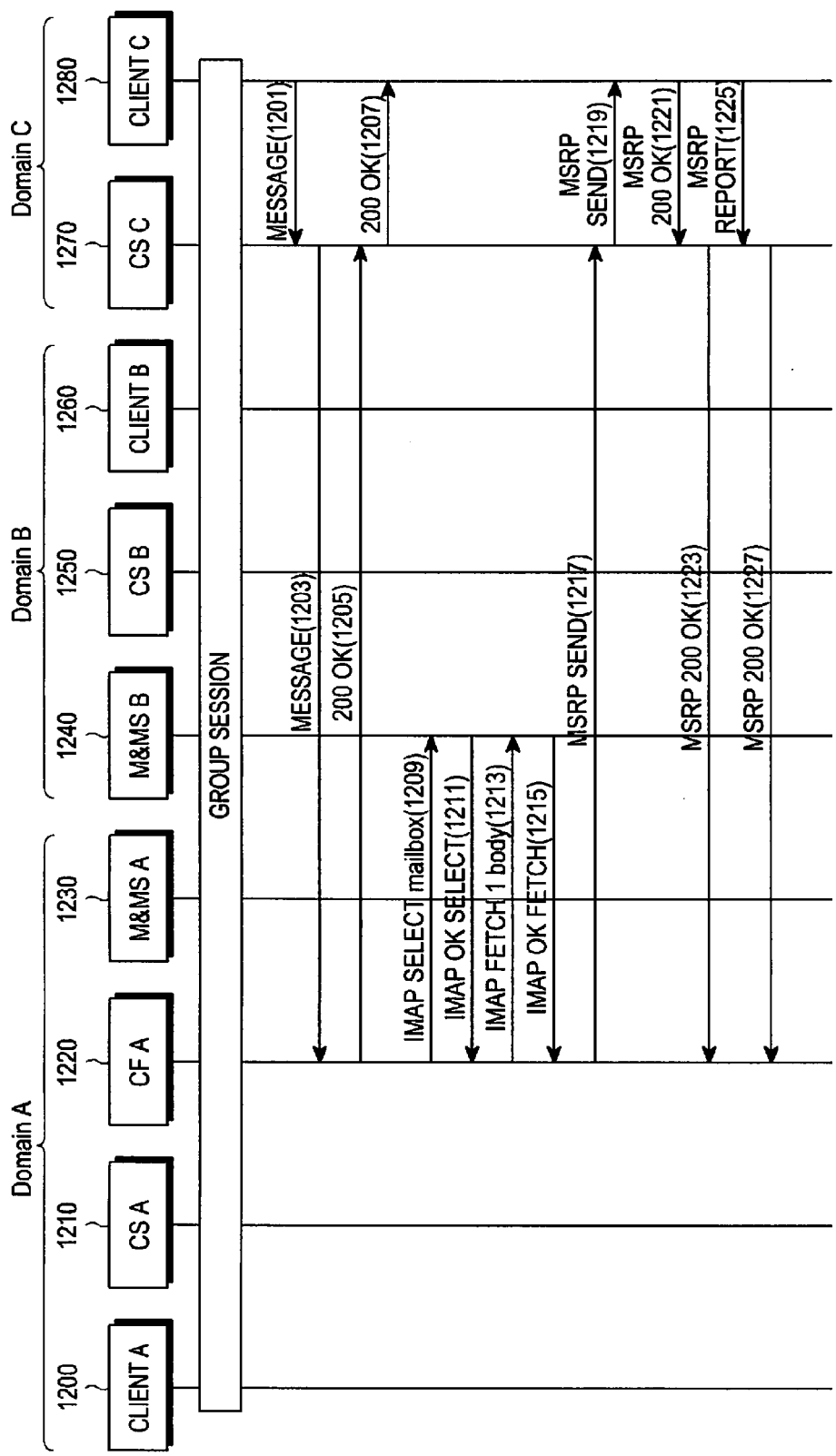
FIG. 17 is a signal flow diagram illustrating a process of transmitting a session history to a client C by a CF A managing a session history according to an embodiment of the present invention.

FIG. 17 illustrates a process of transmitting a session history to a client C by a CF A managing a session history according to an embodiment of the present invention.

Referring to FIG. 17, in step 1201, client C 1280 sends a MESSAGE message to CS C 1270, requesting a group session history. In step 1203, CS C 1270 sends the MESSAGE message to CF A 1220. In step 1205, CF A 1220 sends a 200 OK message to CS C 1270, acknowledging the MESSAGE message. In step 1207, CS C 1270 sends the 200 OK message to client C 1280.

In steps 1209 to 1215, CF A 1220 acquires a group session history by communicating with M&MS B 1240. In step 1217, CF A 1220 transmits the acquired group session history to CS C 1270 using an MSRP SEND message. In steps 1219 and 1221, CS C 1270 transmits the received group session history to client C 1280 and receives a response thereto. In step 1223, CS C 1270 sends an MSRP 200 OK message to CF A 1220, in response to the MSRP SEND message received in step 1217. Thereafter, in step 1225, client C 1280 notifies its acquisition of the group session history by sending an MSRP REPORT message to CS C 1270. In step 1227, CS C 1270 sends the MSRP REPORT message to CF A 1220.

While the invention has been shown and described with reference to certain embodiments thereof, it will be understood by those skilled in the art that various changes in form and details may be made therein without departing from the spirit and scope of the invention as defined by the appended claims and their equivalents.

What is claimed is:

1. A method for receiving a session history by a controlling function (CF) in a communication system, the method comprising the steps of:
   sending, by a CF in a first domain, a first message to a conversation server (CS) in the first domain, the first message requesting the session history;
   if the CS in the first domain is not managing the session history, receiving, by the CF, a second message from the CS in the first domain, the second message specifying an entity managing the session history;
   receiving, by the CF, via the CS in the first domain from a CS in a second domain, a third message including access information for the CS in a second domain, which has the session history;
   sending, by the CF, a fourth message to the CS in the second domain, which has the session history, based on the access information, the fourth message requesting the session history; and
   receiving, by the CF, a fifth message from the CS in the second domain, the fifth message including the session history.

2. The method of claim 1, wherein each of the first message and the fourth message includes a destination address of the CS in the first domain or the CS in the second domain, a content-type for requesting session history-related information, and information about a session identifier.

3. The method of claim 1, wherein each of the third message and the fifth message includes an address of the CS in the first domain or the CS in the second domain, a content-type indicating that the message is a response to a session history request, information about a one-to-one session identifier, information about a group session identifier, and information about a server managing the session history.

4. A method for transmitting and receiving a group session history in a communication system in which a group session is created between at least two client terminals, the method comprising the steps of:
   receiving, by a conversation server (CS) in a first domain, a first message from a client terminal in the first domain, the first message requesting the group session history;
   if the CS in the first domain is not managing the group session history, sending, by the CS, a second message to a controlling function (CF) in the first domain, the second message specifying an entity managing the group session history;
   receiving, by the CS, a third message including access information for a storage area in which the group session history is stored, from a CF in a second domain;
   reading, by the CS, the group session history from the storage area based on the access information; and
   transmitting, by the CS, the read group session history to the client terminal.

5. The method of claim 4, wherein a protocol used to read the group session history includes an internet message access protocol (IMAP).

6. The method of claim 4, wherein a protocol used to transmit the group session history to the client terminal in the first domain includes a message session relay protocol (MSRP).

7. The method of claim 4, wherein each of the first message and the third message includes a session initiation protocol (SIP)-based MESSAGE message.

8. The method of claim 4, further comprising sending, by the CS, a fourth message to the CF in the second domain, the fourth message requesting the group session history.

9. The method of claim 8, wherein each of the first message and the fourth message includes a session initiation protocol (SIP)-based MESSAGE message.

10. The method of claim 8, wherein the CF in the second domain and the CS in the first domain transmit the group session history using a message session relay protocol (MSRP)-protocol message.

11. The method of claim 4, further comprising notifying, by the client terminal in the first domain, the CS in the first domain of its acquisition of the group session history.

12. A method for transmitting and receiving a group session history in a communication system in which a group session is created between at least two client terminals, the method comprising the steps of:

receiving, by a conversation server (CS) in a first domain, a first message from a client terminal in the first domain, the first message requesting the group session history;

if the CS in the first domain is not managing the group session history, sending, by the CS in the first domain, a second message to a controlling function (CF) in the first domain, the second message specifying an entity managing the group session history;

sending, by the CS in the first domain, a third message to a CF in a second domain, the third message requesting the group session history;

receiving, by the CS in the first domain, the group session history from the CF in the second domain, wherein the CF in the second domain acquires the group session history from a storage area in which the group session history is stored; and transmitting, by the CS in the first domain, the group session history to the client terminal in the first domain.

13. The method of claim 12, wherein each of the first messages and the third message includes a session initiation protocol (SIP)-based MESSAGE message.

14. The method of claim 12, wherein the CF in the second domain uses an internet message access protocol (IMAP)-based message to acquire the group session history from the storage area.

15. The method of claim 12, wherein the CS in the first domain uses a message session relay protocol (MSRP)-based message to transmit the group session history.

* * * * *